United States Patent
Klein et al.

(10) Patent No.: US 10,521,046 B2
(45) Date of Patent: Dec. 31, 2019

(54) SYSTEM AND METHOD FOR DISABLED USER ASSISTANCE

(71) Applicant: Poynt Co., Palo Alto, CA (US)

(72) Inventors: Erik Klein, Palo Alto, CA (US); Rishi Taparia, Palo Alto, CA (US); Dorothy Feng, Palo Alto, CA (US); Ji Hyun Park, Palo Alto, CA (US); Saima Kadri, Palo Alto, CA (US); Sathya Iyer, Palo Alto, CA (US); Praveen Alavilli, Palo Alto, CA (US); Ray Tanaka, Palo Alto, CA (US)

(73) Assignee: Poynt Co., Palo Alto, CA (US)

( * ) Notice: Subject to any disclaimer, the term of this patent is extended or adjusted under 35 U.S.C. 154(b) by 0 days.

(21) Appl. No.: 16/040,827

(22) Filed: Jul. 20, 2018

(65) Prior Publication Data
US 2018/0373382 A1 Dec. 27, 2018

Related U.S. Application Data

(63) Continuation of application No. 15/724,149, filed on Oct. 3, 2017, now Pat. No. 10,055,053.

(60) Provisional application No. 62/403,381, filed on Oct. 3, 2016.

(51) Int. Cl.
| | |
|---|---|
| G06Q 40/00 | (2012.01) |
| G06F 3/041 | (2006.01) |
| G09B 5/00 | (2006.01) |
| G09B 21/00 | (2006.01) |
| H04L 9/32 | (2006.01) |
| G06F 3/0488 | (2013.01) |
| G06F 3/044 | (2006.01) |

(52) U.S. Cl.
CPC ........ *G06F 3/0416* (2013.01); *G06F 3/04886* (2013.01); *G09B 5/00* (2013.01); *G09B 21/00* (2013.01); *G09B 21/004* (2013.01); *G09B 21/006* (2013.01); *H04L 9/3231* (2013.01); *G06F 3/044* (2013.01); *G06F 2203/04104* (2013.01); *G06F 2203/04105* (2013.01); *G06F 2203/04809* (2013.01)

(58) Field of Classification Search
CPC .... G07F 19/20; G07F 19/201; G06Q 20/1085
USPC ....................................................... 235/379
See application file for complete search history.

(56) References Cited

U.S. PATENT DOCUMENTS

| | | | |
|---|---|---|---|
| 4,731,842 A | 3/1988 | Smith | |
| 5,294,782 A | 3/1994 | Kumar | |
| 5,859,779 A | 1/1999 | Giordano et al. | |
| 6,323,846 B1 | 11/2001 | Westerman et al. | |
| 6,326,934 B1 | 12/2001 | Kinzie | |

(Continued)

FOREIGN PATENT DOCUMENTS

| | | |
|---|---|---|
| CN | 1323698 A | 11/2001 |
| CN | 102769846 A | 11/2012 |

OTHER PUBLICATIONS

International Search Report for International Application PCT/US2017/054989 dated Feb. 6, 2018.

*Primary Examiner* — Ashik Kim
(74) *Attorney, Agent, or Firm* — Jeffrey Schox; Diana Lin

(57) ABSTRACT

Embodiments of a system and method for assisting disabled users can include: a display configured to receive an input from the disabled user; a set of tactile cues proximal the display; and a processing system configured to: store an assistance map, and map the touch input to a digital input based on the assistance map.

18 Claims, 16 Drawing Sheets

(56) References Cited

U.S. PATENT DOCUMENTS

| | | |
|---|---|---|
| 6,464,135 B1 | 10/2002 | Cohen et al. |
| 7,382,357 B2 | 6/2008 | Panotopoulos et al. |
| 7,413,115 B1 | 8/2008 | Schuster et al. |
| 7,540,410 B2 | 6/2009 | Templeton et al. |
| 7,644,039 B1 | 1/2010 | Magee et al. |
| 7,971,782 B1 | 7/2011 | Shams |
| 8,332,272 B2 | 12/2012 | Fisher |
| 8,600,881 B2 | 12/2013 | Nguyen et al. |
| 8,751,971 B2 | 6/2014 | Fleizach |
| 9,244,547 B2 | 1/2016 | Zhou et al. |
| 9,721,247 B2 | 8/2017 | Bedier et al. |
| 10,096,012 B2 | 10/2018 | Bedier et al. |
| 2003/0071859 A1 | 4/2003 | Takami et al. |
| 2003/0074328 A1 | 4/2003 | Schiff et al. |
| 2004/0066422 A1 | 4/2004 | Chandane |
| 2004/0199470 A1 | 10/2004 | Ferry et al. |
| 2006/0172266 A1 | 8/2006 | Rogers et al. |
| 2006/0261155 A1 | 11/2006 | Templeton et al. |
| 2007/0168282 A1 | 7/2007 | Giordano |
| 2007/0241183 A1 | 10/2007 | Brown et al. |
| 2008/0184363 A1 | 7/2008 | Narasimhan |
| 2008/0227391 A1 | 9/2008 | Rosenberg |
| 2010/0121701 A1 | 5/2010 | Nguyen et al. |
| 2010/0274688 A1 | 10/2010 | Hammad |
| 2011/0113328 A1 | 5/2011 | Marzke |
| 2011/0184824 A1 | 7/2011 | George et al. |
| 2011/0184865 A1 | 7/2011 | Mon et al. |
| 2011/0302406 A1 | 12/2011 | Machani |
| 2012/0016678 A1 | 1/2012 | Gruber et al. |
| 2012/0016759 A1 | 1/2012 | Lee et al. |
| 2012/0150601 A1 | 6/2012 | Fisher |
| 2013/0071817 A1 | 3/2013 | White et al. |
| 2013/0073448 A1 | 3/2013 | Wall et al. |
| 2013/0124855 A1 | 5/2013 | Varadarajan et al. |
| 2013/0135238 A1* | 5/2013 | Naccache ............ G09B 21/005 345/173 |
| 2013/0226815 A1 | 8/2013 | Ibasco et al. |
| 2013/0246066 A1 | 9/2013 | Choi |
| 2013/0254053 A1 | 9/2013 | Hayhow et al. |
| 2013/0254117 A1 | 9/2013 | Von Mueller et al. |
| 2014/0006190 A1 | 1/2014 | Loomis et al. |
| 2014/0256251 A1 | 9/2014 | Caceres et al. |
| 2015/0254662 A1 | 9/2015 | Radu |
| 2016/0026990 A1 | 1/2016 | Rezayee et al. |

\* cited by examiner

SYSTEM AND METHOD FOR DISABLED USER ASSISTANCE

CROSS-REFERENCE TO RELATED APPLICATIONS

This application is a continuation of U.S. patent application Ser. No. 15/724,149, filed 3 Oct. 2017, which claims the benefit of U.S. Provisional Application Ser. No. 62/403,381, filed on 3 Oct. 2016, both of which are herein incorporated in their entirety by this reference.

TECHNICAL FIELD

This invention relates generally to the point of sale field, and more specifically to a new and useful system and method of disabled user assistance in the point of sale field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1A:
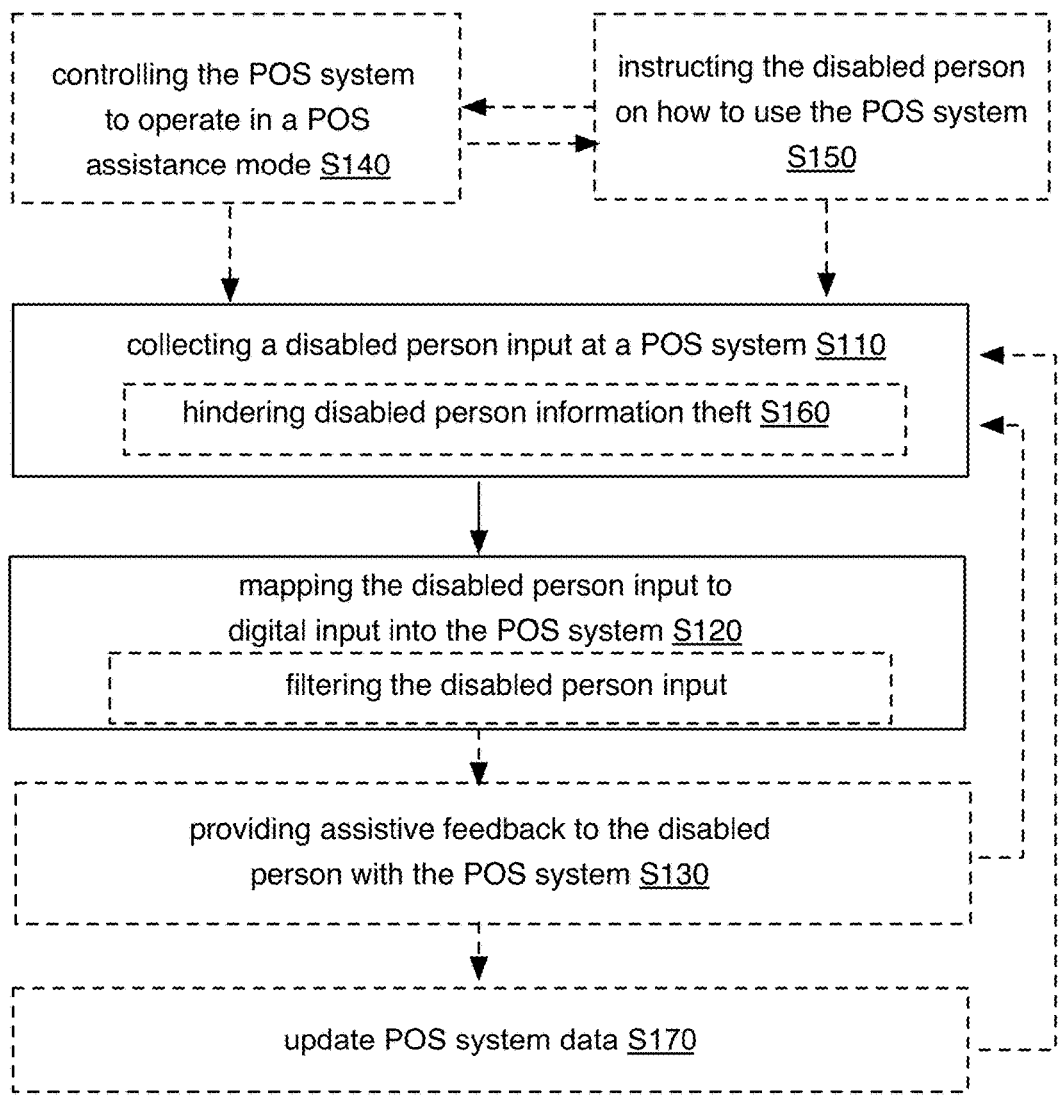
FIG. 1A is a schematic representation of an embodiment of the method.
Figure 1B:
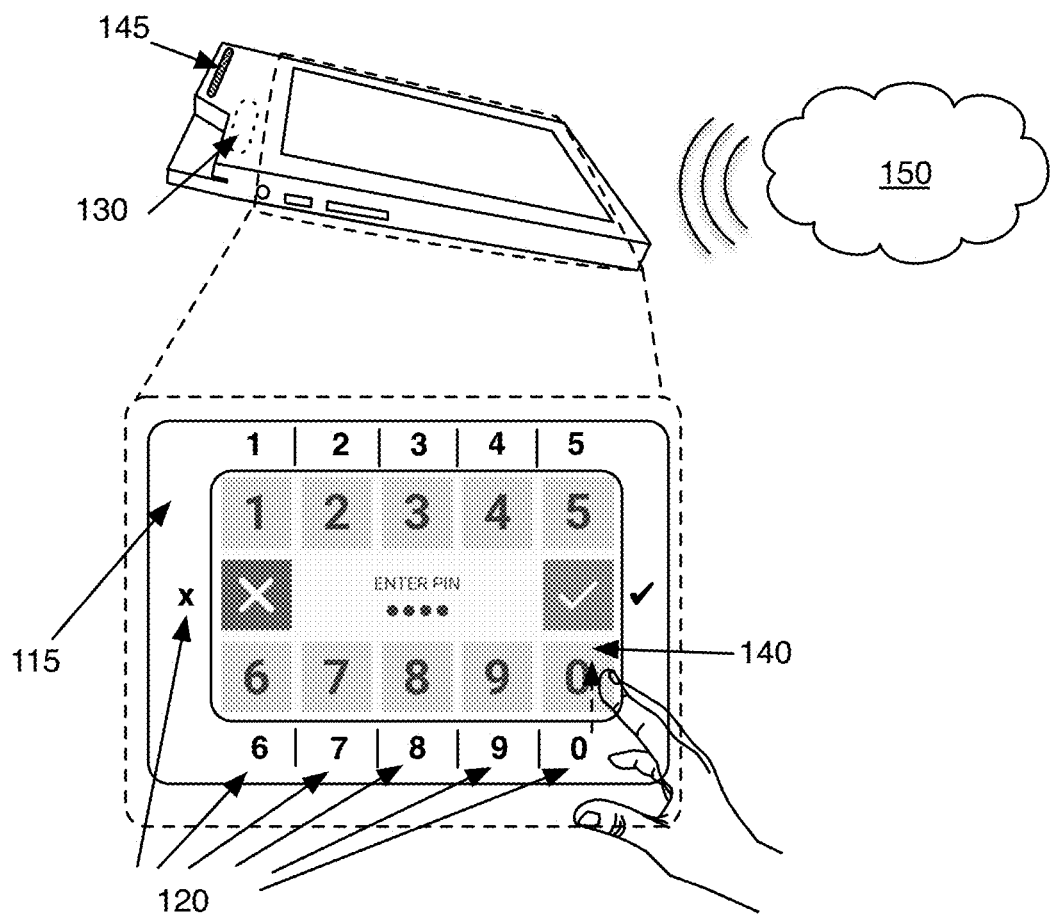
FIG. 1B is a schematic representation of an embodiment of the system.

As shown in FIG. 1B, embodiments of a system 100 for assisting a disabled user can include: a display 110 configured to receive an input (e.g., a touch input) from the disabled user; a set of tactile cues 120 proximal the display 110; and a processing system 130 configured to: store an assistance map, and map the touch input to a digital input based on the assistance map.

Embodiments of the system 100 and method 200 can function to assist disabled users (e.g., vision disability, mobility impairment, cognitive disability, hearing disability, etc.) in completing transactions (e.g., a point of sale transaction, etc.) with a touchscreen system (e.g., a point of sale system). Embodiments can additionally or alternatively function to identify conditions where initiating an assistance mode with assistive features can be appropriate in aiding a disabled user. This can be desirable in touchscreen point of sale (POS) systems, which can lack the tactile cues 120 that enable disabled users (e.g., visually impaired users) to interact with conventional POS systems. In a specific example, the system 100 can assist a disable user with a point of sale (POS) transaction (e.g., sale, return, cash withdrawal, etc.), where the system 100 can include a secure processing system 132 configured to: store an assistance map and a non-assistance map; operate between an assistance mode where the secure processing system 132 maps a touch input from a disabled user to a digital input associated with the POS transaction based on the assistance map, and a non-assistance mode where the secure processing system 132 maps a touch input from a non-disabled user to a second digital input based on the non-assistance map; and encrypt the first digital input; and a main processing system 134 coupled to and distinct from the secure processing system 132, where the main processing system 134 is configured to: receive the encrypted first digital input (e.g., payment information such as a PIN number) from the secure processing system 132; and transmit the encrypted first digital input to a remote entity (e.g., a payment gateway, etc.) associated with the POS transaction. Additionally or alternatively, embodiments described herein can be applied for assisting disabled users with other applications (e.g., non-POS applications) requiring user inputs.

Figure 6A:
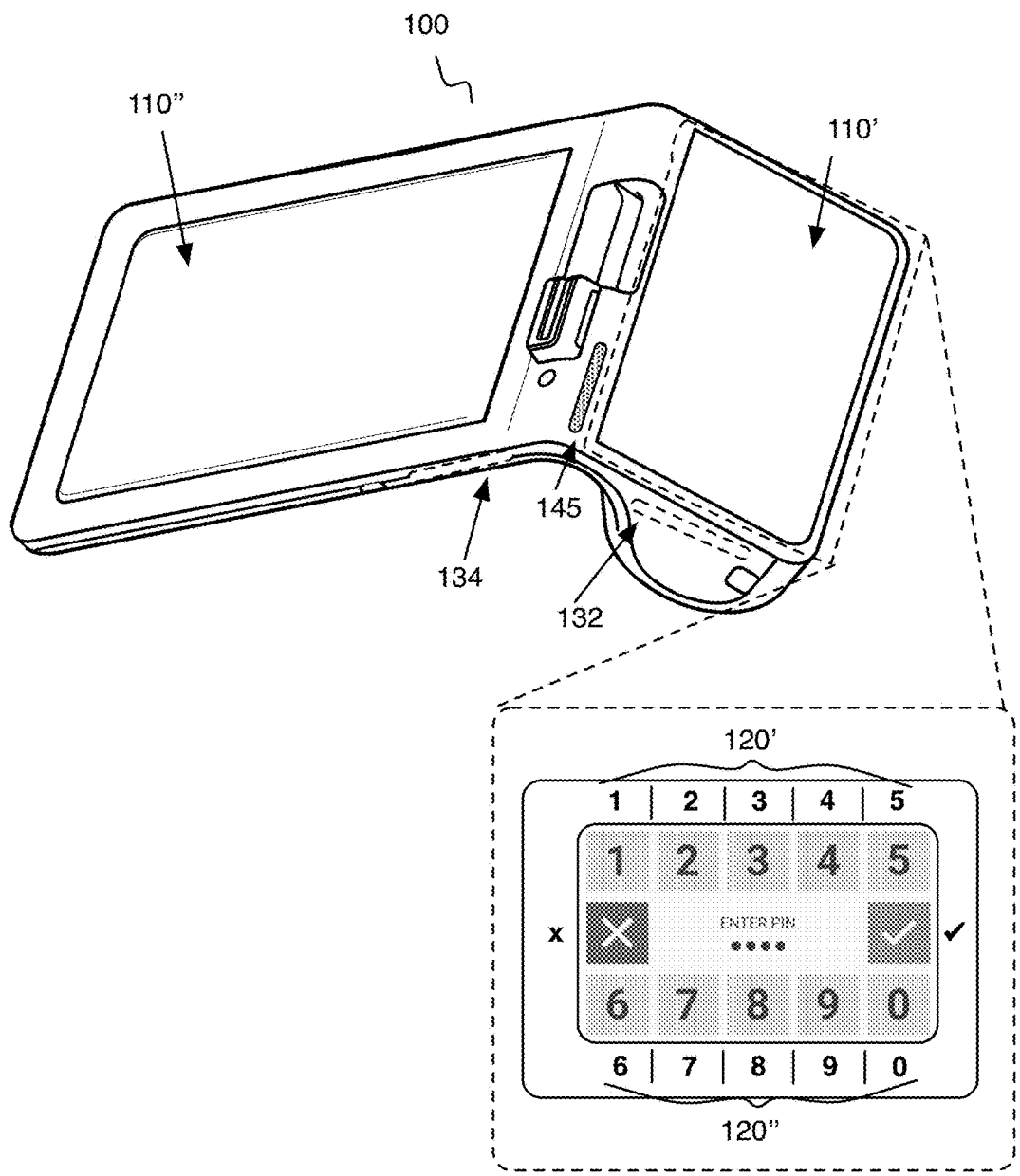
FIGS. 6A-6C are schematic representations of variations of the system.
Figure 6B:
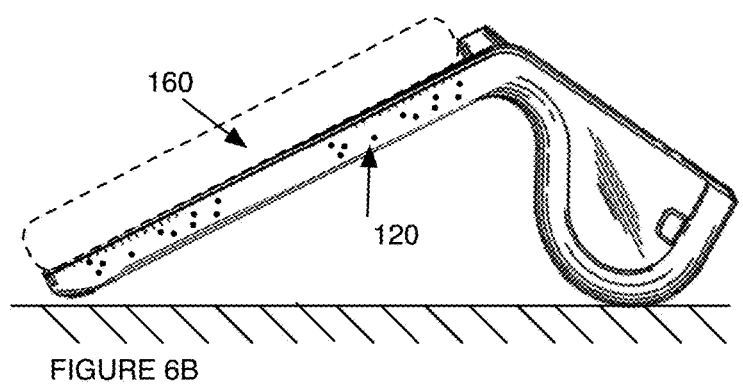

Embodiments of the system 100 can optionally include: an assistive feedback module 145, a view barrier 160 (e.g., as shown in FIG. 6B) obstructing viewing of the display 110 by other individuals (e.g., for hindering disabled user information theft, etc.), a communication module including radios for communication protocols, a printer (e.g., a Braille printer; a printer for printing textured characters; etc.), sensors (e.g., cameras, microphones, light sensors, orientation sensors, such as accelerometers or gyroscopes, location sensors, such as GPS systems, triangulation systems, or beacon systems, etc.), secondary inputs (e.g., secondary touchscreens), secondary outputs (e.g., speakers, a secondary display, etc.), payment hardware (e.g., card readers, NFC payment systems, etc.), data connectors (e.g., data pins, standardized jacks, etc.), power storage (e.g., a battery), secondary POS systems, and/or any other suitable components. Additionally or alternatively, the system 100 and/or method of use can include any elements described in and/or analogous to U.S. application Ser. No. 15/635,462 filed 28 Jun. 2017, and/or U.S. application Ser. No. 15/332,540 filed 24 Oct. 2016, which are both incorporated herein in their entireties by this reference. Components of the system 100 can entirely or partially be executed by, hosted on, communicate with, and/or otherwise include: a remote computing system 150 (e.g., a server, at least one networked computing system, stateless, stateful), a local computing system, a client device, a user device (e.g., smartphone, laptop, tablet, smart watch, etc.), databases (e.g., storing input maps, user profiles, etc.), and/or any suitable component. Communication by and/or between any components of the system 100 (e.g., between a remote computing system 150 and a POS system; between a user device and a POS system; between POS systems; etc.) can include wireless communication (e.g., WiFi, Bluetooth, radiofrequency, etc.) and/or wired communication. However, the system Dm can be configured in any suitable manner.

2. Benefits.

First, the technology can transform entities into different states or things. For example, the technology can augment a POS system with assistive features (e.g., coupling a removable set of tactile cues to a touch display of the POS system; updating the POS system with associated software enabling an assistance mode for mapping touch inputs associated with the tactile cues to digital inputs for a POS transaction; etc.). In another example, the technology can transform user touch inputs from disabled users at a touch display to digital inputs based on assistance maps applied by a processing system connected to the touch display.

Second, the technology can apply computer-implemented rules (e.g., through assistance maps applied by the processing system; for operating between assistance modes and non-assistance modes; etc.) in conferring improvements to the computer-related technical field of assisting disabled users in interfacing with POS systems.

Third, the technology can amount to an inventive distribution of functionality across a network for improving computer-related technology. For example, the POS system can include a secure processing system separate from the main processing system, which can permit the improved, secure storage and retrieval of assistance maps (e.g., at the secure processing system) in mapping disabled user inputs to digital inputs associated with private payment information (e.g., PIN numbers, etc.) for POS transactions. In another example, the system can include a remote computing system acting as a common coordination point for a plurality of POS systems (e.g., associated with different merchants; etc.), where the remote computing system can transmit updated assistance maps, control instructions for operating between assistance modes and non-assistance modes, and/or other suitable data to POS systems (e.g., a fleet of POS systems) for assisting disabled users.

Fourth the technology can leverage a specialized POS system (e.g., including motion sensors, optical sensors, payment hardware, etc.) in facilitating POS transactions involving a disabled user. For example, the technology can sample sensor data (e.g., optical data) at the POS system; and identify conditions (e.g., presence of a disabled user, etc.) for automatically initiating an assistance mode based on the sensor data (e.g., through facial recognition algorithms employed on the optical data in order to identify visually impaired users; etc.). The technology can, however, provide any other suitable benefit(s) in the context of using non-generalized systems for assisting disabled users.

3. System

The display 110 can function to collect inputs from a disabled user (e.g., a disabled customer, a disabled merchant, etc.). The display 110 can additionally or alternatively function to present information (e.g., through tactile feedback) to disabled users and/or non-disabled users (e.g., non-disabled secondary users such as merchants or employees; etc.). The display 110 is preferably connected to and/or controlled by the processing system 130 (e.g., a secure processing system 132 of the processing system 130; a main processing system 134 of the processing system 130; etc.), but can additionally or alternatively be connected to and/or controlled by a secondary user device, user device, and/or any other suitable components. For example, the display 110 can be communicatively connected to the secure processing system 132 for securely collecting and processing disabled user touch inputs corresponding to sensitive information (e.g., private payment information).

Figure 4:
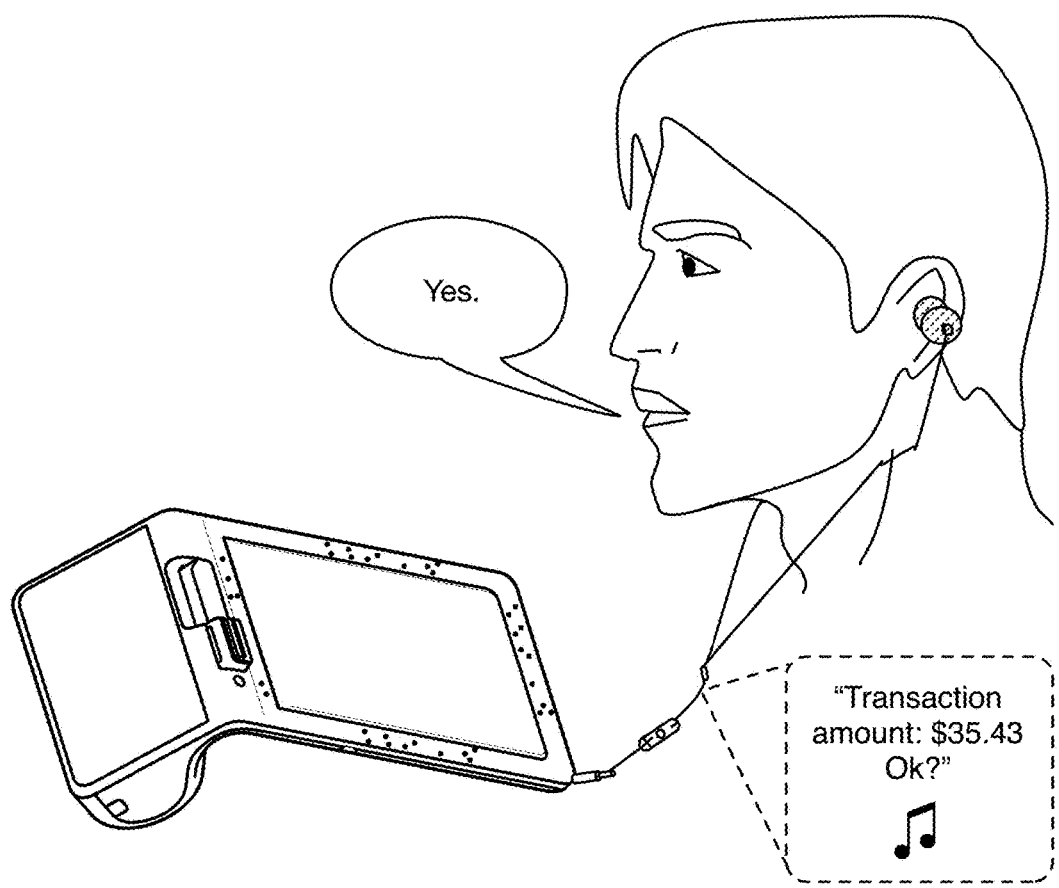
FIG. 4 is a schematic representation of an example of disabled user inputs and an audio assistive feedback module.

The display 110 preferably includes a touch display with a sensor set for collecting touch inputs from disabled users (e.g., where touch input coordinates are associated with coordinates of the display 110). Additionally or alternatively, the display 110 can include any of: a touchscreen overlaid the display component, a tactile overlay including tactile cues 120 overlaying the display 110, tixels, a microphone (e.g., as shown in FIG. 4), a camera, a motion sensor, a non-motion sensor, a pointer, and/or any other suitable input components. For example, the display 110 can include a biometric sensor (e.g., a fingerprint sensor configured to collect touch inputs; an iris recognition biometric sensor; etc.). However, input components of the display 110 can be otherwise configured.

The system 100 can include any number of displays 110 of any suitable type. For example, as shown in FIG. 6A, the system 100 can include a first disabled user-facing touch display 110' and a second touch display 110" facing a secondary user. However, the display 110 can be otherwise configured.

The set of tactile cues 120 can function to guide the disabled user in entering a disabled user inputs at the display 110 (e.g., touch inputs at a touch display). The set of tactile cues 120 can include any number of tactile cues 120 including any of: raised tactile elements (e.g., numbers, letters, Braille, symbols such as checkmarks, etc.), recessed tactile elements, indentations, textured elements (e.g., rough surface, smooth surface, etc.), tactile pixels ("tixels," dynamically adjustable or static), geometric elements, orientated elements, and/or any suitable tactile cue. The tactile cues 120 can be the same color or different color as the coupling component. For example, the set of tactile cues 120 can include a first tactile cue 120' representing a first number (e.g., a first raised number outline), and a second tactile cue 120" representing a second number (e.g., a second raised number outline). Tactile cues 120 can be of any suitable texture (e.g., rough, smooth), depth (e.g., relative the exposed face of the display 110) size, pattern, and/or possess any suitable characteristic.

Figure 6C:
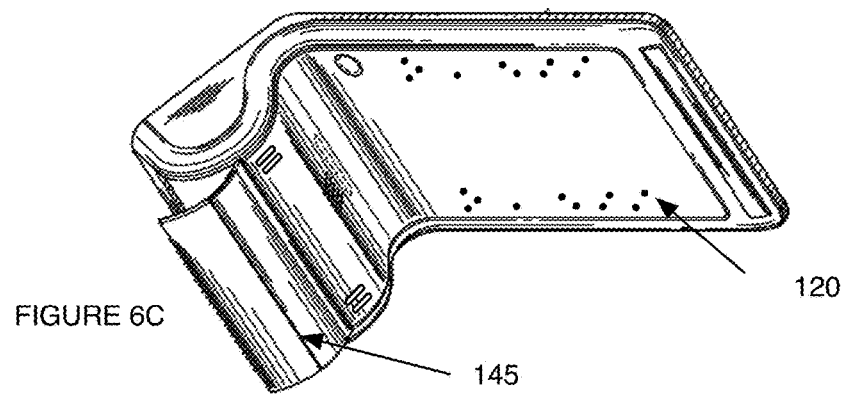

The set of tactile cues 120 is preferably removably coupleable to the display 110 (and/or other suitable components) at any of: a bezel 115, a perimeter, a side (e.g., as shown in FIG. 6B), a surface (e.g., screen surface, bottom surface as shown in FIG. 6C, etc.), and/or any other suitable regions of the display 110 (and/or other suitable components). For example, as shown in FIG. 6A, the set of tactile cues 120 can include a first subset of tactile cues 120' removably coupleable to a first side of the display 110 (e.g., a first side of a bezel 115 of a touch display), and a second subset of tactile cues 120" removably coupleable to a second side of the display 110 (e.g., a second side of the bezel 115, where the second side opposes the first side, etc.). However, tactile cues 120 can be integrated into the display (e.g., manufactured as a singular piece with the display bezel) or couple to the display 110 and/or other suitable components in any suitable configuration.

Figure 11A:
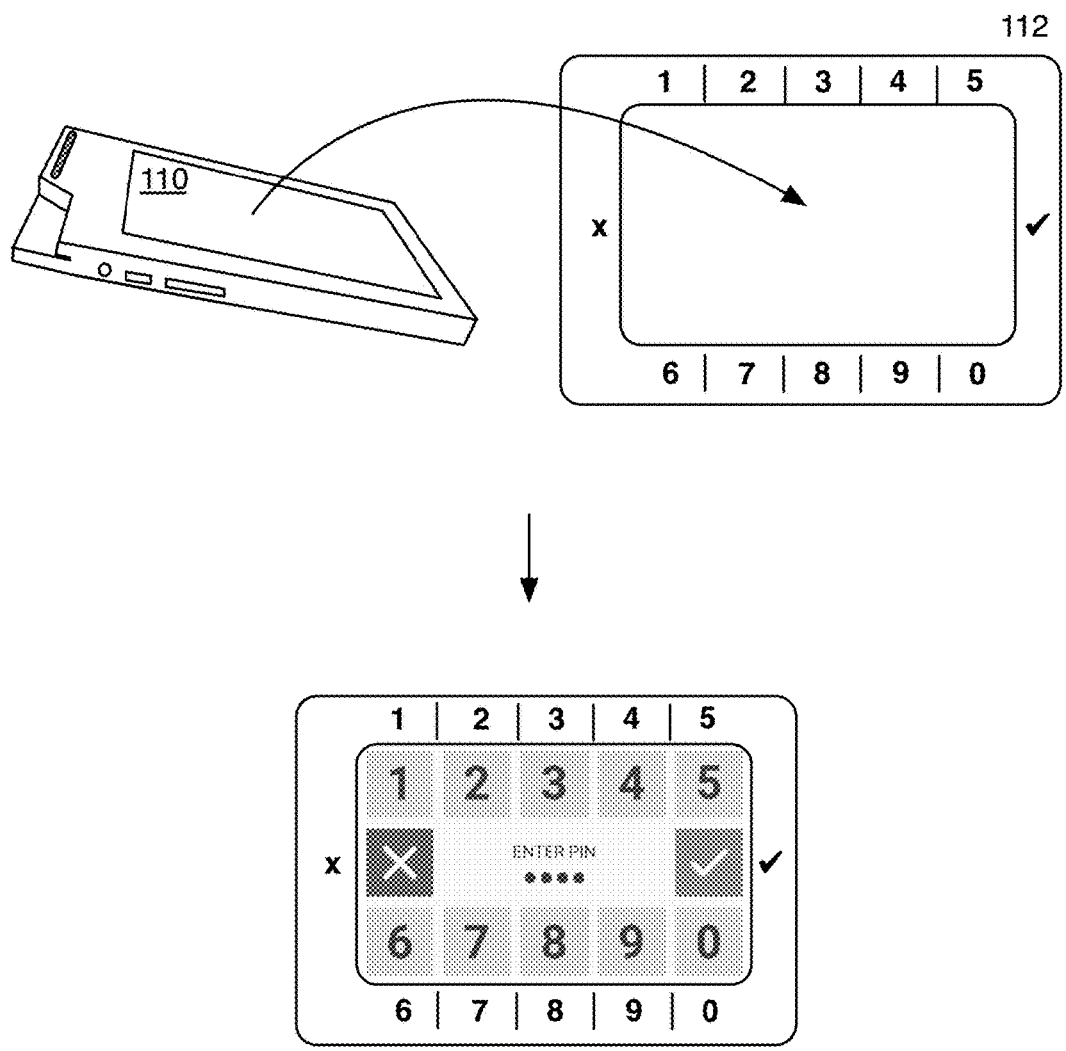
FIGS. 11A-11B are schematic representations of variations of coupling components.
Figure 11B:
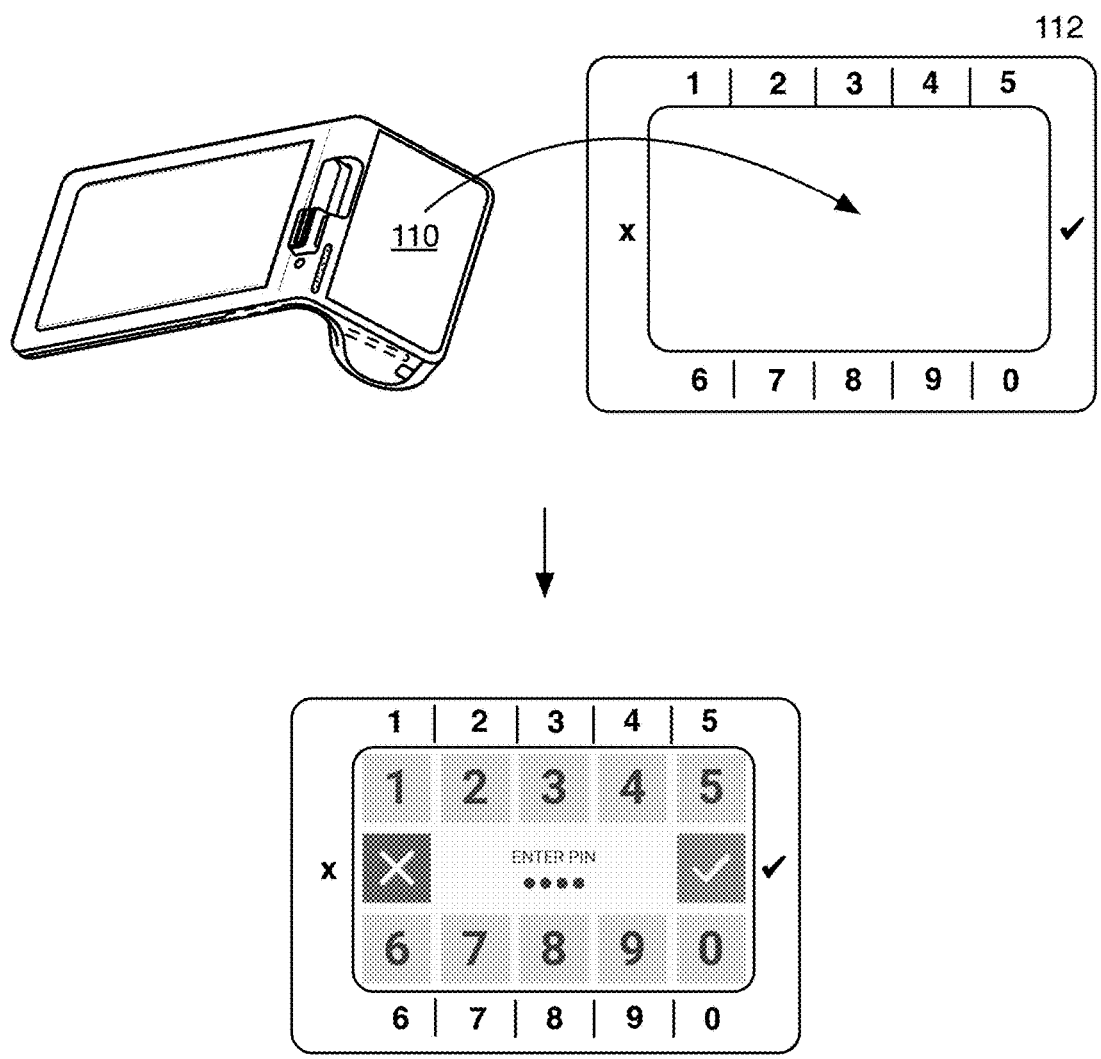

Tactile cues 120 are preferably removably coupleable to other components of the system 100 through a coupling mechanism including any of: an interference or friction fit, adhesives (e.g., single sided adhesives for sticking tactile cues 120 onto regions of the display 110; double sided adhesives; etc.); clips; mechanical fasteners (e.g., latch, strap, rubber, etc.); and/or other suitable coupling mechanisms. In a first variation, as shown in FIGS. 11A-11B, the tactile cues 120 can couple to the display 110 through a coupling component 112 (e.g., a plate, a sleeve, etc.) including the tactile cues 120 and defining an opening adapted to a surface (e.g., a back surface) of the display 110. In an example, the display 110 can be placed in the opening of the coupling component 112 to enable the edges of the coupling component 112 to wrap around the perimeter of the display 110 in coupling the tactile cues 120 to a display region proximal the perimeter (e.g., a bezel 115 of the display 110). In a second variation, a tactile cue 120 can couple to a display region through adhesive material at a surface of the tactile cue 120 (e.g., a back surface of the tactile cues 120, for coupling the back surface of the tactile cues 120 to regions at the bezel 115 of the display 110; etc.). In a third variation, tactile cues 120 can be strapped (e.g., tied) to the display 110 (e.g., along the bezel 115 of the display 110). Alternatively, the tactile cues 120 can be integrated with the display 110 (e.g., permanently fixed to the display 110; etc.) and/or other suitable components. However, the tactile cues 120 can removably couple to components of the system 100 (e.g., a plurality of displays 110) through any suitable mechanisms.

As shown in FIG. 1B, tactile cues 120 are preferably positioned (e.g., locatable) at the display 110 (e.g., at a bezel 115 surrounding the display 110; proximal the perimeter of the display 110; at a side face connected to the broad face of the display 110, at a bottom surface opposing the broad face, etc.), such as when the tactile cues 120 are coupled to the display 110. Additionally or alternatively, tactile cues 120 can be positioned at any suitable location in relation to components of the POS system. A tactile cue 120 is preferably configured to indicate (e.g., describe, represent, shaped in the form of, etc.) a corresponding touch input option (e.g., number inputs, character inputs, confirmatory inputs, etc.), but can additionally or alternatively describe a corresponding POS system component (e.g., position, type, etc.). For example, the set of tactile cues 120 can include a first tactile cue 120' (e.g., indicating a number) positioned at a bezel 115 of the display 110, and a second tactile cue 120" can be positioned at a side edge of the display 110 (e.g., indicating a position of card reader, etc.). In another example, a tactile cue 120 can indicate a starting point (e.g., a tactile cue 120 positioned at the beginning of a series of tactile cues 120 representing individual numbers and oriented in increasing order clockwise along the bezel 115).

In a first variation, tactile cues 120 are locatable at a bezel 115 of the display 110. The bezel 115 can partially or fully surround a screen of the display 110, can be raised or depressed relative the depth of the screen, and/or have any suitable dimensions. For example, as shown in FIG. 6A, the POS system can include numbers printed on a surface of the bezel 115 (e.g., a broad surface of the bezel 115, a side surface of a raised bezel 115, etc.). In another example, a Braille tactile cue can be connected to a trace tactile cue (e.g., a raised tactile line connecting the Braille tactile cue to a corresponding touch input option). Tactile cues 120 positioned at the bezel 115 can be evenly distributed along the bezel 115, unevenly distributed and/or otherwise oriented (e.g., aligned along an axis; etc.). However, tactile cues 120 at the bezel 115 can be otherwise configured. The tactile cues 120 preferably leave the entirety or majority of the touch display's active face open (e.g., not covered or masked by the tactile cues 120), such that the touch display regions between adjacent input option regions (e.g., a contiguous set of input option regions) is exposed, but can alternatively or additionally selectively mask different portions of the touch display. For example, the tactile cues 120 can mask the entirety of the touch display except for the input regions corresponding to touch input options. In a second example, the tactile cues 120 mask the entirety of the touch display, wherein the tactile cues 120 are conductive, actuated, and vertically aligned with the corresponding touch input option (when installed) such that depression of a tactile cue causes the tactile cue to contact (and enter) the corresponding touch input option. However, the tactile cues 120 can be otherwise configured. In a second variation, the tactile cues 120 can include dynamically modifiable tactile cues. For example, the tactile cues 120 can be tactile cues 120 controlled by a tactile electronic display (e.g., a refreshable Braille display, a display 110 configured to present tactile pixels, etc.). However, dynamically modifiable tactile cues can be otherwise configured. In a third variation, the tactile cues can be defined by a tactile overlay. For example, the system 100 can include a tactile overlay including a plurality of tactile cues 120 and configured to be overlaid on top of the display 110. However, tactile cues 120 can be configured in any suitable manner.

The processing system 130 can function to process inputs from disabled users. The processing system 130 preferably includes a secure processing system 132 (e.g., secure processor) and a main processing system 134 (e.g., main processor) that is separate from the secure processing system 132, but can alternatively include only the secure processing system 132, or only the main processing system 134. However, the processing system 130 can include any suitable number and types of processors for assisting disabled users.

The processing system 130 preferably stores one or more maps defining mappings between physical inputs (e.g., touch inputs at a touch display, such as a single touch, multi-touch, gestures, touchscreen coordinates of the touch input, etc.) collected from users and digital inputs (e.g., corresponding to touch input options presentable at the display; such as a numerical input for a PIN number corresponding to a debit card, etc.). Maps can include: assistance maps (e.g., used with the assistance mode for disabled users), non-assistance maps (e.g., default maps used for non-disabled users), sensor-based maps (e.g., defining different mappings based on data collected by system sensors, such as based on different orientations indicated by motion sensors of a POS system, such as accelerometers, gyroscopes, or IMUs, etc.), general input maps (e.g., mapping touch inputs, mechanical inputs, oral inputs, for disabled users and/or non-disabled users, etc.), and/or any suitable maps. Different maps can be assigned to be used for inputs at different regions of the display 110 (e.g., assistance maps for input regions proximal tactile cues 120 and/or edges of the display 110, non-assistance maps for input regions radially inward from the edges of the display 110, such as for a standard number pad positioned at the center of the display 110), for inputs at different displays 110 (e.g., assistance maps for a customer-facing display and non-assistance maps for a secondary user-facing display, etc.), and/or can be applicable for any suitable regions of any suitable components.

Maps are preferably generated (e.g., defining the mappings for the map; at a remote computing system 150, at the processing system 130, etc.) based on locations of tactile cues 120 relative the display 110 (e.g., when the tactile cues 120 are coupled to the display 110). For example, a mapping can define a touch input option region (e.g., an activation region 140 representing the number "0") at the touch display to be aligned along a coordinate axis (e.g., a y-axis of the touchscreen) with a corresponding tactile cue 120 (e.g., indicating the number "0"). In a specific example, the map can define a touch gesture originating at the touch display proximal the tactile cue 120 and ending at a touch input option region (e.g., a continuous swipe gesture originating at touchscreen coordinates between the tactile cue 120 and the touch input option, continuing radially inwards towards the touch input option, entering the touch input option area, and ending within the touch input option area), where the touch gesture can be mapped to selection of the touch input option (e.g., digital input of the number "0"). In another specific example, touch input option regions can be defined (e.g., through coordinates of the touch display) to be proximal (e.g., adjacent or substantially adjacent) corresponding tactile cues 120 (e.g., where the touch input option regions are positioned inwards, towards the center of the display 110, from corresponding tactile cues 120 located along the bezel 115 of the display 110, etc.). Additionally or alternatively, maps can be generated based on locations of tactile cues 120 relative any other suitable components, generated independent of tactile cue locations, and/or generated based on any suitable information.

In a first variation, a map can define activation regions 140 (e.g., corresponding to coordinates of the touch display). Valid inputs from the disabled user preferably originate at and/or proximal an activation region 140, but activation regions 140 can be associated with end regions (e.g., where valid inputs end at and/or proximal an activation region 140), intermediary regions (e.g., where valid inputs interface with an intermediary region), and/or any other suitable type of regions. In an example, a map can define activation regions 140 based on locations of the set of tactile cues 120 relative the touch display, where each tactile cue of the set of tactile cues 120 corresponds to and is locatable proximal a different activation region of the set of activation regions 140, and define a mapping between touch inputs at the set of activation regions 140 and digital inputs. In a specific example, a map can define a different touch coordinate area for each activation region of the set of activation regions 140 based on the locations of the set of tactile cues 120 relative the touch display. In another specific example, the touch inputs at non-activation regions outside of the set of activation regions 140 can be filtered (e.g., based on an assistance map). However, activation regions can be otherwise configured.

Figure 12A:
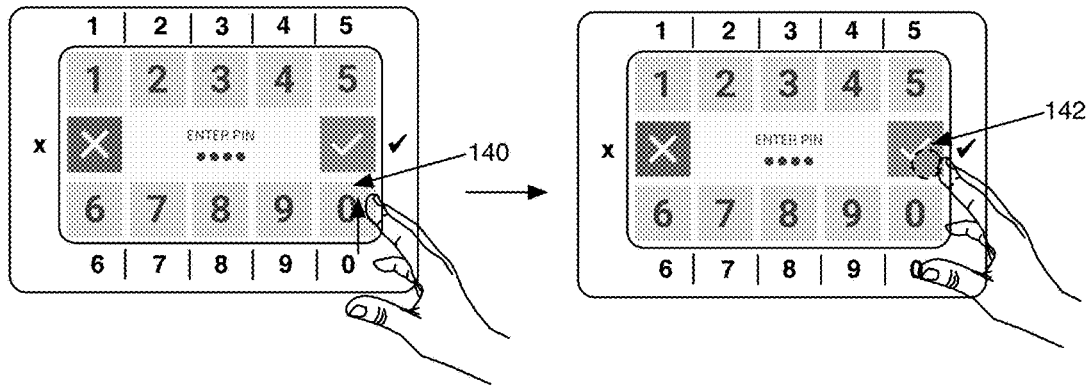
FIGS. 12A and 12B are schematic representations of a first and second example of confirming the input, respectively.
Figure 12B:
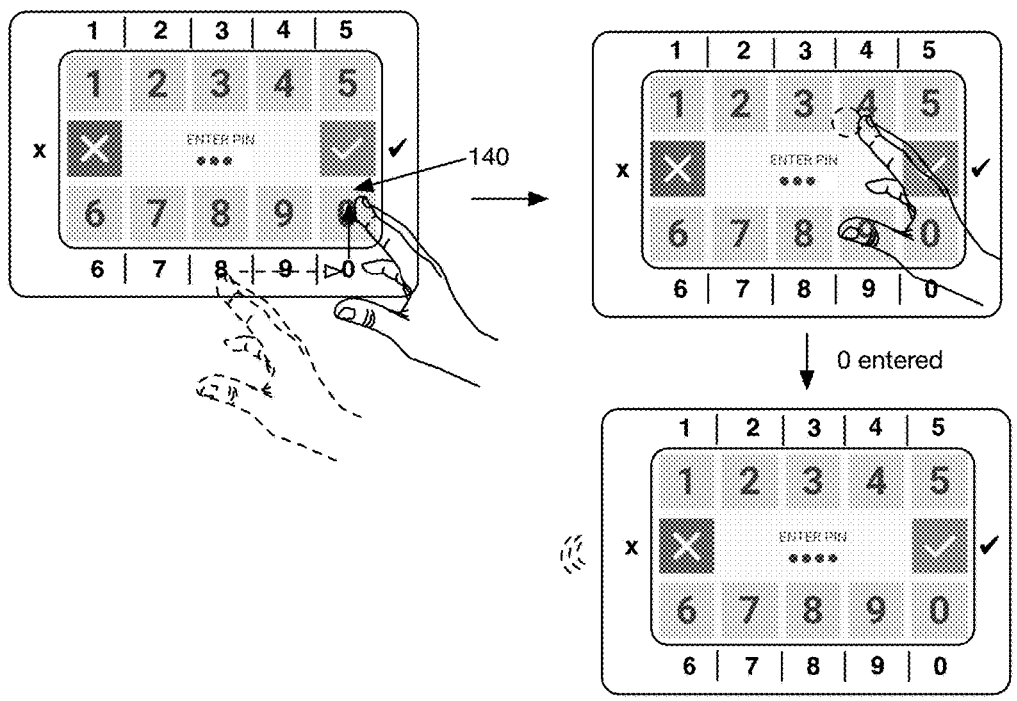

In a second variation, as shown in FIGS. 12A and 12B, a map can define a confirmatory region 142, where valid inputs preferably include one or more inputs interfacing with the confirmatory region 142 (e.g., a user tap at a confirmatory region 142, such as following a swipe touch input at an activation region 140, etc.). The confirmatory region 142 can be a predefined region on the touch display (example shown in FIG. 12A), be any region on the touch display (example shown in FIG. 12B), be on the tactile cues (e.g., bezel, etc.), or be defined in any suitable location. In an example, the processing system 130 can be configured to map a user touch input to a digital input in response to a confirmatory touch input from the disabled user at a confirmatory region 142 (e.g., at the touchscreen; at a mechanical input of the display; etc.). However, confirmatory regions can be otherwise configured.

Figure 13:
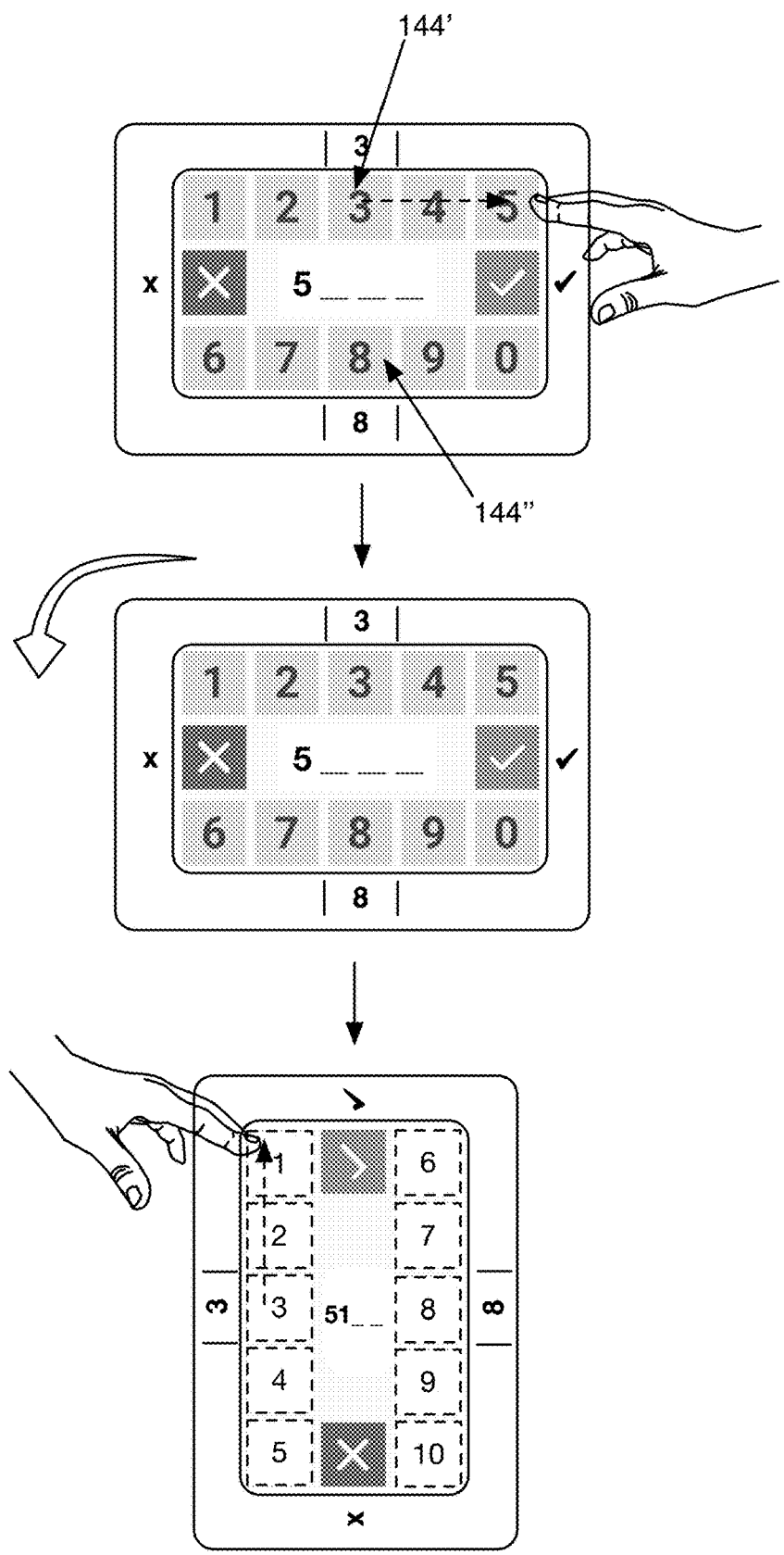
FIG. 13 is a schematic representation of an example of reference regions.

In a third variation, a map can define a reference region 144, where mappings can be based on touch input locations (e.g., coordinate locations) relative to the reference region 144 (e.g., as opposed to being based on absolute touch input locations). For example, as shown in FIG. 13, a mapping can define a reference region 144 (e.g., corresponding to "3" and proximal a tactile cue indicating "3"), and can define associated regions positionally relative to the reference region 144 (e.g., along a coordinate x-axis of the touch display; such as a first associated region adjacent and to the left of the reference region 144 along the coordinate x-axis, where the first associated region maps to "2"; a second associated region adjacent and to the left of the first associated region, where the second associated region maps to "1"; etc.). Multiple reference regions 144 can be defined (e.g., as shown in FIG. 13, a first reference region 144' corresponding to "3", where a touch input originating at the first reference region 144' can be evaluated with regards to the touch input end location relative the first reference region 144', and where the touch input can be mapped to "1", "2", "3", "4", or "5"; a second reference region 144" corresponding to "8", where a touch input originating at the second reference region 144" can be evaluated with regards to the touch input end location relative the second reference region 144", and where the touch input can be mapped to "6", "7", "8", "9", or "0"; etc.). Additionally or alternatively, reference regions and/or associated regions can be otherwise configured. Regions (e.g., activation regions 140, confirmatory regions 142, reference regions 144", etc.) defined by maps can be the same (e.g., where a region is defined as an activation region 140 and a reference region 144, etc.), overlapping, distinct (e.g., without overlap), and/or otherwise defined. However, maps can define any suitable regions for assisting disabled users.

The system 100 can include any suitable number of maps, where maps can be selected from a plurality based on any suitable criteria. For example, the processing system 130 can select an assistance map from a set of assistance maps stored at the processing system 130, where each assistance map can define a different mapping between the touch inputs and the digital inputs. In a first variation, selection of maps can be based on the mode in which the processing system 130 is operating (e.g., selecting an assistance map while in assistance mode; selecting a non-assistance mode while in non-assistance mode; etc.). The system operation mode can be selected by a user (e.g., a merchant) by toggling a physical switch or selecting a digital button, or otherwise selected. In a second variation, selection of maps can be based on sensor data. For example, selection of maps can be based on orientation (e.g., indicated by motion sensors of the POS system). In a specific example, as shown in FIG. 13, different assistance maps can be selected based on horizontal versus vertical orientation of a POS system (e.g., when held by a disabled user), where the different assistance maps can define different mappings for regions associated with reference regions 144', 144" (e.g., a first assistance map for a horizontal orientation and mapping a first associated region, a second associated region, a first reference region 144', a third associated region, and a fourth associated region to "1", "2", "3", "4", and "5", respectively; a second map for a vertical orientation, such as after rotating the POS system 90 degrees counter-clockwise, and mapping the first associated region, second associated region, the first reference region 144', third associated region, and fourth associated region to "5", "4", "3", "2", and "1", respectively; etc.). In another example, the map can be selected based on the device orientation, as determined by the device operating system (e.g., wherein the processing system 130 can received the orientation identifier from the operating system). In another example, selection of maps can be based on optical data (e.g., different assistance maps for different types of disabilities identified through images captured by the POS system, etc.). Sensor data sampled at sensors of the POS system can be collected at a main processing system 134 and transmitted to a secure processing system 132 that can select a map based on the sensor data, but communicating sensor data to the processing system 130 for map selection and/or other processes can be configured in any suitable manner (e.g., received, transmitted, by any suitable components, etc.). In a fourth example, the maps can be selected based on the bezel identifier received at the device. The bezel identifier can be associated with a map, orientation, or other information, wherein the processing system 130 can automatically select the associated map in response to bezel identifier receipt. The bezel identifier can be received from the bezel (e.g., through RFID, Bluetooth™, NFC, WiFi, or other communication system), read from the bezel (e.g., wherein the bezel includes a QR or other optical identifier on the interior surface), entered by a user (e.g., a merchant), determined based on the bezel coupling location (e.g., wherein the system housing can include coupling contacts, pressure sensors, etc.), or otherwise received. Additionally or alternatively, map selection can be based on time of day, secondary user identifier, customer profiles, user inputs (e.g., dynamically initiating an assistant mode with corresponding assistant map selection based on touch input patterns collected from the user; etc.), and/or any other suitable criteria. Maps are preferably stored and/or applied at the secure processing system 132 but can additionally or alternatively be stored and/or applied at the main processing system 134 and/or other components (e.g., remote computing system 150, etc.). However, a single map can be used in all use contexts, or the maps can be otherwise configured.

The processing system 130 can preferably operate between: an assistance mode (e.g., a triggered mode), a non-assistance mode (e.g., a default mode), and/or any suitable modes (e.g., where the processing system 130 can perform functionality associated with a single mode or multiple modes, etc.). Operation in assistance mode preferably includes mapping of user inputs to digital inputs based on one or more assistance maps, but can additionally or alternatively include omitting graphical representations of the digital inputs (e.g., of the touch input options) at the display 110, providing assistive feedback, detecting conditions for ceasing assistance mode, notifying other users (e.g., secondary users, aids, etc.), and/or any other suitable processes. Operation in non-assistance mode preferably includes mapping of user inputs to digital inputs based on one or more non-assistance maps, but can additionally or alternatively include presenting graphical representations of the digital inputs at the display 110, detecting conditions for initiating assistance mode, and/or any other suitable processes. However, different modes can have any suitable distributions of functionality (e.g., shared, dependent, independent, etc.)

The processing system 130 can include a secure processing system 132, which can function to securely process payment information collected from the disabled user. The secure processing system 132 can be configured to store and/or apply maps; operate in assistance modes, non-assistance modes, and/or other modes; receive transaction information from the main processing system 134; receive payment data from payment hardware; receive disabled user inputs from the display 110; use maps to map disabled user inputs to digital inputs; generate tixels; identify conditions appropriate for initiating and/or ceasing an assistance mode; store assistance mode events (e.g., switching events from non-assistance mode to the assistance mode, inputs collected during assistance modes, assistance mode session metadata such as duration of the session, etc.); transmit transaction information (e.g., encrypted payment information) to the main processing system 134, and/or perform any other suitable functionality. The secure processing system 132 is preferably connected to the display 110 (e.g., where the display 110 is exclusively connected to the secure processing system 132 rather than other processors such as the main processing system 134). However, the secure processing system 132 can be otherwise configured.

The processing system 130 can include a main processing system 134, which can function to monitor POS system operation; control data communication with external systems (e.g., disabled user devices, remote computing systems 150, secondary user devices, etc.); download, store, and execute applications; receive and/or generate transaction information (e.g., encrypted information including digital inputs mapped to from user inputs; sale items; sale total; etc.); detect or connect to a user device; and/or perform any other suitable functionality. However, the main processing system 134 can be otherwise configured.

Additionally or alternatively, the processing system 130 can include and/or otherwise be analogous to components described in U.S. application Ser. No. 15/635,462 filed 28 Jun. 2017, which is incorporated herein in its entirety by this reference.

Figure 5:
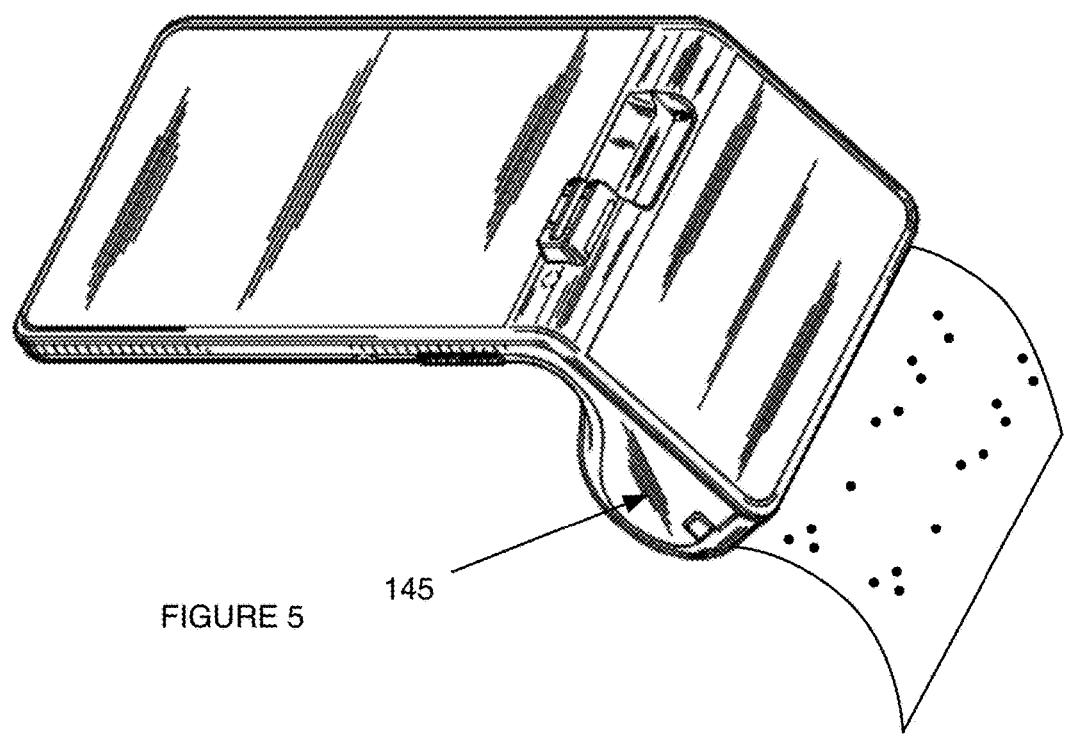
FIG. 5 is a schematic representation of an example of a printer assistive feedback module.

The system 100 can optionally include an assistive feedback module 145, which can function to administer assistive feedback to a disabled user for completing a POS transaction. The assistive feedback module 145 can include any of: an audio feedback module (e.g., speaker, audio port, etc.), haptic feedback module (vibrational feedback elements, force feedback elements, tactile electronic displays, etc.), graphical feedback modules, printer (e.g., as shown in FIG. 5), and/or any suitable feedback components. The assistive feedback module 145 is preferably controlled by the secure processing system 132, but can additionally or alternatively be communicably coupled (e.g., electrically connected, wirelessly connected) to the main processing system 134. However, the assistive feedback module 145 can be otherwise configured.

4. Method.

As shown in FIG. 1A, embodiments of a method 200 for assisting a disabled user can include: collecting a disabled user input (e.g., at a POS system) S110, and mapping the disabled user input to a digital input (e.g., for the POS system) S120. The method 200 can additionally or alternatively include providing assistive feedback to the disabled user S130, operating in an assistance mode S140, instructing a disabled user on how to use the POS system S150, hindering disabled user information theft S160, and/or updating POS system data S170.

Data described herein (e.g., user inputs, digital inputs, maps, sensor data, etc.) can be associated with any suitable temporal indicators (e.g., seconds, minutes, hours, days, weeks, etc.) including one or more: temporal indicators indicating when the data was collected, determined, transmitted, received, and/or otherwise processed; temporal indicators providing context to content described by the data; changes in temporal indicators (e.g., data over time; change in data; data patterns; data trends; data extrapolation and/or other prediction; etc.); and/or any other suitable indicators related to time.

One or more instances and/or portions of the method 200 and/or processes described herein can be performed asynchronously (e.g., sequentially), concurrently (e.g., in parallel; etc.), in temporal relation to a trigger event, and/or in any other suitable order at any suitable time and frequency by and/or using one or more instances of the system 100, components, and/or entities described herein.

Figure 2:
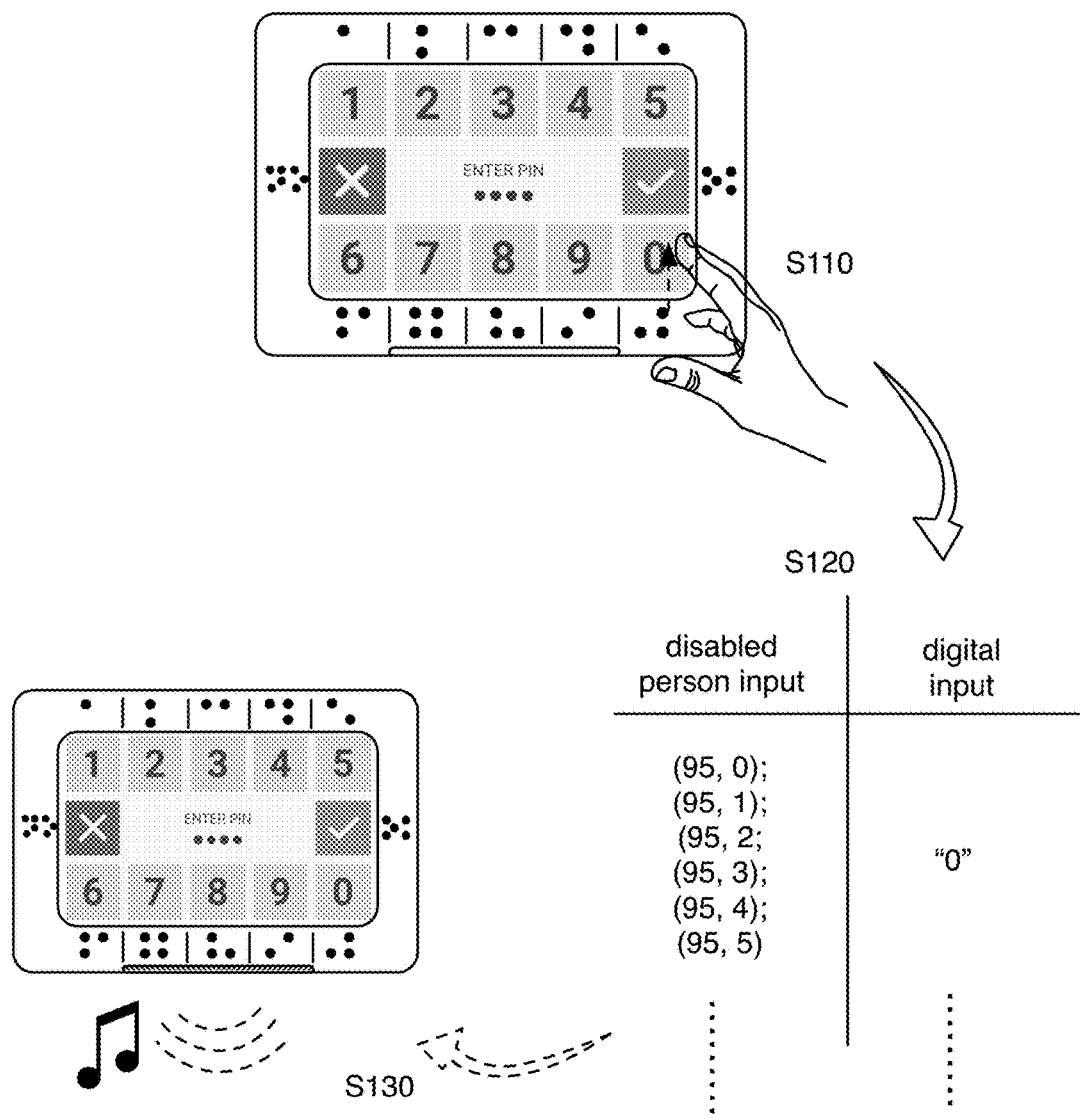
FIG. 2 is a schematic representation of an embodiment of the method.

As shown in FIGS. 1A and 2, collecting a disabled user input system S110 can function to collect one or more inputs from a disabled user. Disabled user inputs can include any of touch inputs (e.g., touch gestures, shaking, applied pressure, etc.), mechanical inputs (e.g., number pad entries, keyboard inputs, operation buttons, etc.), audio inputs (e.g., speech), biometric inputs (e.g., fingerprint, eye scan, etc.), visual inputs (e.g., movements, hand gestures, etc.), mental inputs, and/or any other suitable input.

The method 200 can optionally include processing the disabled user input into a form that is mappable to a digital input for the POS system. In examples, processing the disabled user input can include any of: converting touch inputs to coordinates and/or predefined gestures, processing speech into text, applying computer vision algorithms to visual inputs, and/or other operations.

Disabled user inputs are preferably associated with a tactile cue (e.g., a tangible physical cue positioned proximal the display of the POS system). For example, the method 200 can include collecting a disabled user input corresponding to coordinates at a touchscreen input component, the coordinates proximal the position of a tactile cue positioned proximal the display (e.g., at a bezel of the display). However, disabled user inputs can be independent from tactile cues.

Figure 3:
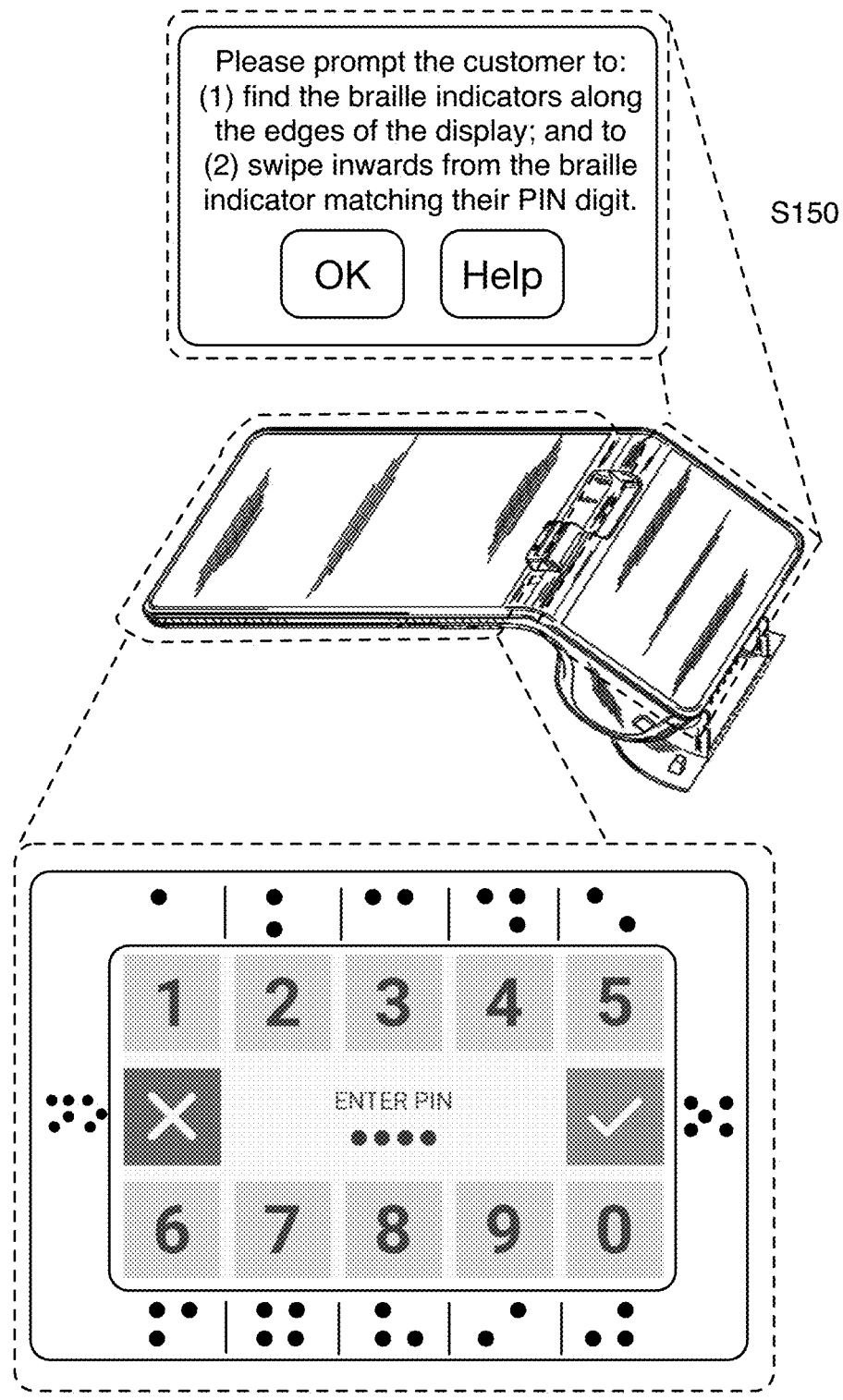
FIG. 3 is a schematic representation of a variation of instructing the user to use the POS system.
Figure 7:
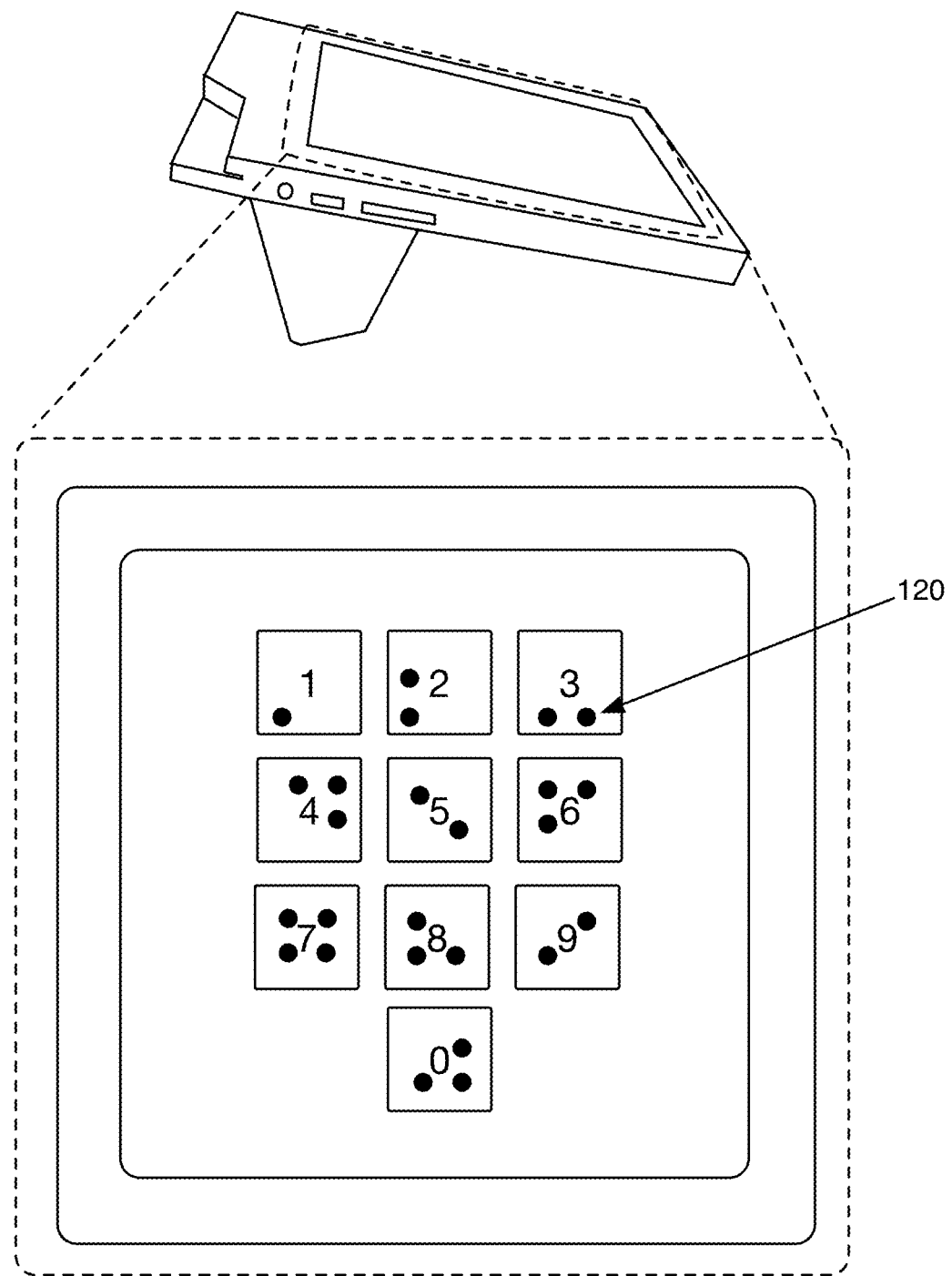
FIG. 7 is a schematic representation of an example of tactile pixels.
Figure 8:
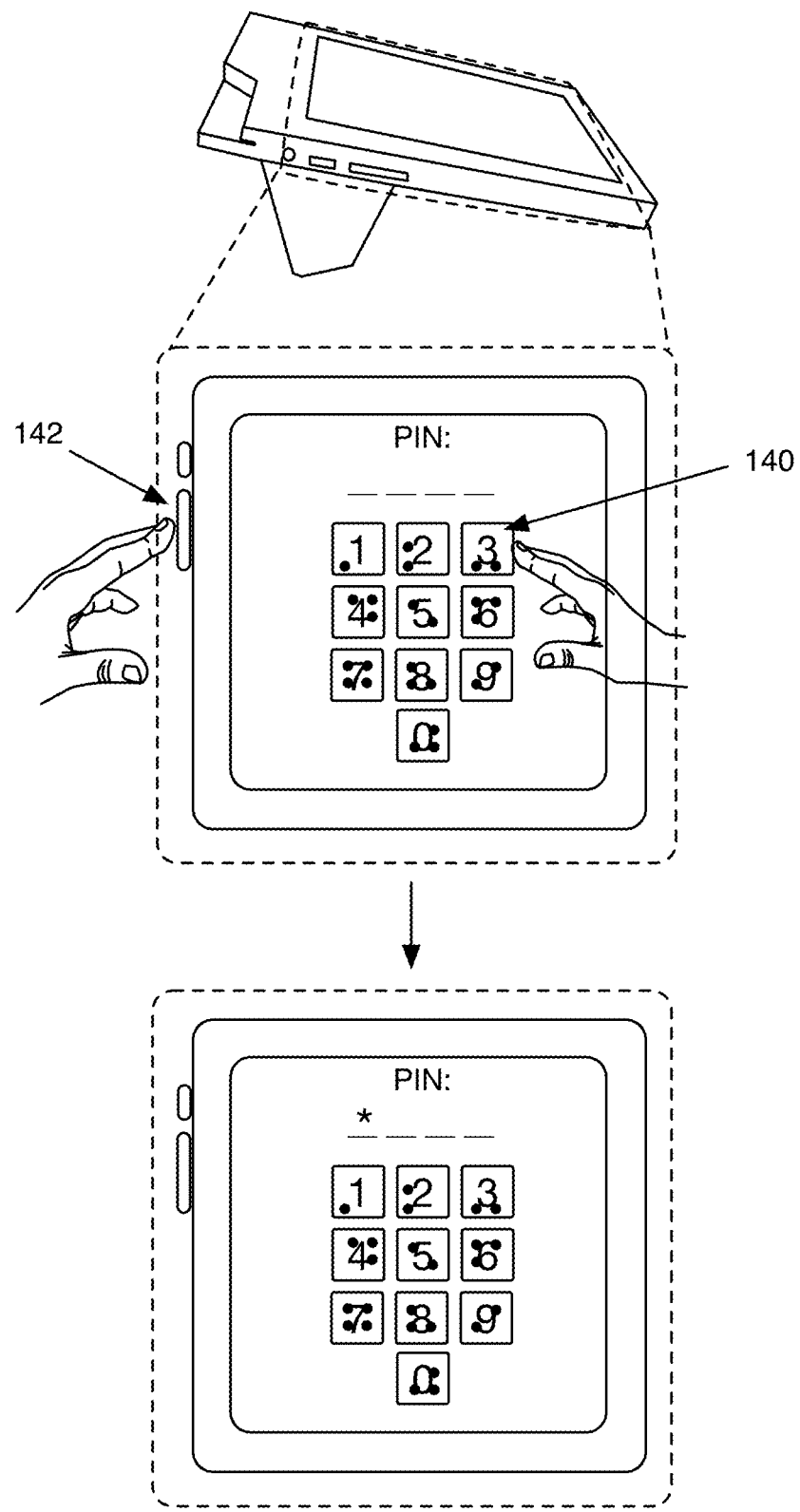
FIG. 8 is a schematic representation of a variation of an input option scheme including a confirmatory input.
Figure 10:
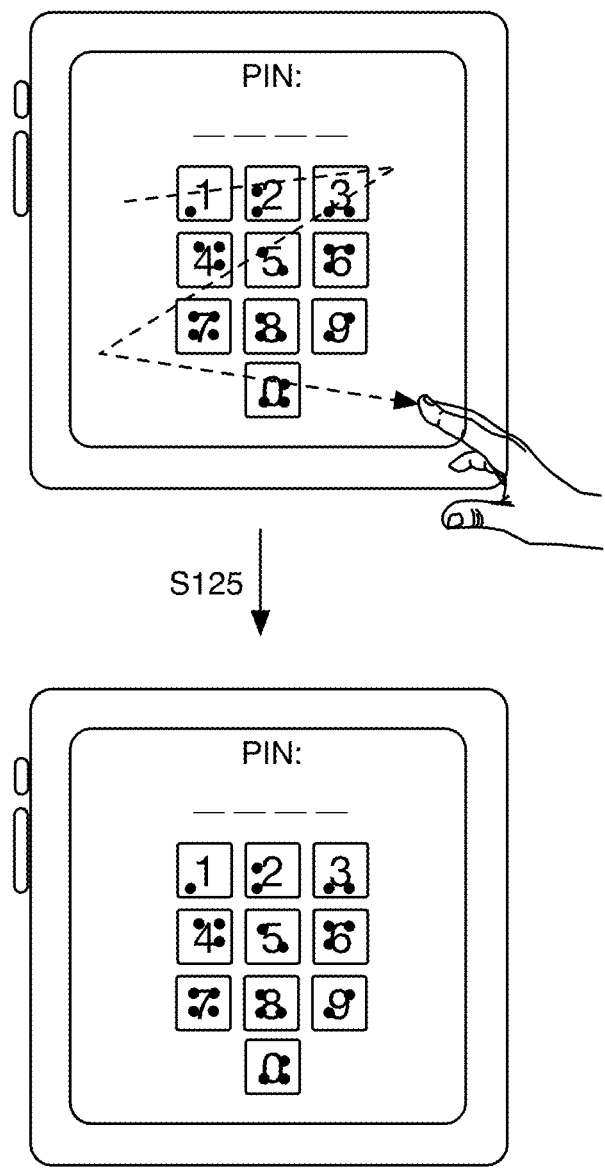
FIG. 10 is a schematic representation of a variation of filtering an input.

In a first variation of an input option scheme, the method 200 can include collecting a disabled user single-touch input (e.g., with a single finger) at, proximal, through, and/or otherwise positionally associated with a touch input option (e.g., a digital number icon presented at the display and representing an option to select for entering a PIN number input; touch input options corresponding to an activation region, confirmatory region, reference region, associated region; etc.). Touch input options are preferably selectable by touch inputs (e.g., at activation regions; at reference regions; at regions associated with reference regions; at confirmatory regions; etc.), where touch input options can include any of: character entries (e.g., letters, numbers), confirmation options (e.g., confirm, deny, etc.), signature entries, and/or any suitable options. The touch input options can be graphically displayed at the display or graphically invisible (e.g., not visually ascertainable to prevent other users from observing the selection of the touch input options; not displayed; etc.). As shown in FIGS. 2-3, in examples, the method 200 can include providing a set of touch input options positioned inwards from the perimeter of the display, each touch input option corresponding to a distinct tactile cue. Each tactile cue is preferably proximal its corresponding touch input option, but can otherwise be located in relation to touch input options. In a specific example, as shown in FIGS. 2-3, the method 200 can include providing, along a top edge of a bezel, a first subset of tactile cues representing the numbers "1", "2", "3", "4", and "5"; presenting a first subset of touch input options at a display region inwards from the top edge, the first subset of touch input options corresponding to the first subset of tactile cues; providing, along a bottom edge of the bezel, a second subset of tactile cues representing the numbers "6", "7", "8", "9", and "0"; and presenting a second subset of touch input options at a display region inwards from the bottom edge, the second subset of touch input options corresponding to the second subset of tactile cues. In other specific examples, the set of touch input options can be positioned along a single edge of the display (e.g., touch input options for numbers 0-9 positioned along the right edge of the touchscreen), all edges of the display (e.g., numbers 1-3 positioned along the top edge of the touchscreen, numbers 4-6 positioned along the right edge, numbers 7-9 positioned along the bottom edge, and the number 0 as well as confirmation options positioned along the left edge; etc.). Additionally or alternatively, any number of tactile cues associated with any suitable touch input options (e.g., tactile cues for numbers, characters, etc.) can be provided at any suitable position of the bezel and/or the POS system. In another specific example, the touch input options can be distanced from the edges of the display and/or touch screen (e.g., touch input options representing a standard number pad as shown in FIGS. 7-8 and 10). The touch input options representing the standard number pad can be positioned radially inwards from the edges of the display, where collecting a single-touch input can include collecting a swipe gesture originating proximal an edge of the display, continuing radially inwards, and ending or passing through at a touch input option representing an input value of the standard number pad, where the gesture can be interpreted as the input value. The method 200 can optionally require an additional confirmatory input (e.g., through a mechanical input, through a tap touch input at a suitable region of the display, etc.), such as for confirming a swipe gesture (e.g., where the gesture is interpreted as noise if the confirmatory input is not received). However, touch input options and/or corresponding tactile cues can be otherwise configured.

In examples of the first variation, receiving a disabled user single-touch input can include receiving a sequence of single-touch inputs (e.g., a tracing gesture contacting a plurality of touch input options such as a subset of numerical touch input options). For example, the method 200 can include receiving a first single-touch input (e.g., a swipe gesture from a tactile cue to and/or passing through a touch input option) indicating a touch input option to be selected, and a second single-touch input (e.g., a single or double tap on the same touch input option after the swipe gesture) confirming the selection of the touch input option, which can aid with preventing false positive inputs. In a specific example, the method 200 can include providing touch input options representing the standard number pad, where the touch input options can be graphically invisible and positioned radially inwards from the edges of the display, where collecting a single-touch input can include collecting a swipe gesture originating proximal an edge of the display, continuing radially inwards, and ending at, proximal, or through a touch input option representing a number of the standard number pad, and where the method 200 can further include requiring confirmatory input (e.g., at a mechanical input, confirmatory audio input, etc.) for confirming the swipe gesture. In another example, the method 200 can include receiving a sequence of taps representing a Morse code input at the touchscreen. In another example, the method 200 can include receiving a sequence of swipe gestures representing drawn letters and/or numbers at the touchscreen (e.g., at an enlarged input option area spanning the entire touchscreen). However, receiving single-touch inputs at touch input options associated with tactile cues can be otherwise performed.

In examples of the first variation, collecting a disabled user touch input can include receiving a disabled user touch input (e.g. swipe) originating at the tactile cue, which can be identified through any of: tactile cue sensors (e.g., touch sensors, capacitive sensors, light sensors, pressure sensors, and/or other sensors embedded in and/or otherwise associated with the tactile cue), touch inputs originating at input regions (e.g., a set of input coordinates) defined to be associated with one or more corresponding tactile cues (e.g., a tactile cue proximal the corresponding input region), or otherwise associated with the tactile cue. In a specific example, the tactile cue is positioned on the display, where touch inputs originating at the tactile cue can be detected with sensors at display at the tactile cue position (e.g., when tixels are used). In a second specific example, the tactile cue can be positioned proximal the display, where touch inputs originate at regions of the display (e.g., touch screen) mapped to and/or proximal the respective tactile cue are interpreted as the input value associated with the tactile cue. Origination of a disabled user input at and/or proximal a tactile cue can be used as a condition for mapping the disabled user input to a digital input. For example, the method 200 can include disregarding disabled user inputs originating at a tactile cue but ending at a non-touch input option region of the display. In another example, the method 200 can include receiving a disabled user input originating at a tactile cue, passing through one or more touch input options, and mapping to a digital input corresponding to the last touch input option that was touched and/or the touch input option with the largest proportion of user input. In another example, the method 200 can include disregarding disabled user inputs that do not originate at a tactile cue (e.g., do not originate at activation regions proximal tactile cues, do not pass through a threshold proportion of the activation region, originate at an inward portion of the activation region beyond an input perimeter arranged radially inward of the bezel; to reduce false positives from a disabled user touching the display to familiarize themselves with the display; etc.). However, identifying a disabled user input originating at and/or proximal a tactile cue can be otherwise performed.

In a second variation of an input option scheme, the method 200 can include collecting a disabled user multi-touch (e.g., with multiple fingers) input at one or more touch input options. In a first example, collecting a disabled user multi-touch input includes receiving a first touch input indicating a touch input option to be selected (e.g., a first finger held at the touch input option), and concurrently receiving a second touch input confirming the touch input option (e.g., a tap by a second finger at a confirmatory touch input option). In a specific example, the confirmatory touch input option is positioned at a corner of the touchscreen and corresponds to a tactile cue proximal the corner. In a second example, collecting a multi-touch input can include presenting duplicate touch input options (e.g., a first and second touch input option both corresponding to entry of the number "1") at different positions of the display, and requiring a multi-touch input at a touch input option and a corresponding duplicate touch input option (e.g., to minimize false positives). In a third variation, collecting the input can include receiving a first touch input indicating a touch input option to be selected (e.g., using the first variation of the input option scheme), and sequentially receiving a second touch input confirming the touch input option (e.g., a tap or other predetermined confirmation gesture or input; received within the confirmation region of the touch device) within a predetermined time window of first touch input receipt (e.g., 1 second, 10 milliseconds, etc.). The confirmation region can be a predefined region of the touch device (e.g., distinct from the other input options), overlap with the input options, be the entirety of the touch device (e.g., entirety of the touchscreen), be a button on the bezel, be on a second input device (e.g., merchant-side screen, user mobile device), or be otherwise defined. However, collecting a disabled user multi-touch input can be otherwise performed.

As shown in FIG. 7, in a third variation of an input option, the method 200 can include providing tactile cues overlaying and/or integrated with the display of the POS system. One or more tactile cues can be aligned (e.g., along the depth of the display) with one or more corresponding input options, but can be otherwise positioned relative associated input options. In an example, the providing tactile cues can include generating tixels at the display. Generating tixels is preferably performed by the secure processing system, but can additionally or alternatively be performed with a main processing system. In a specific example, generating tixels can include generating a set of tixels configured in a pattern (e.g., Braille pattern, number shapes, etc.) of a standard number pad (e.g., as shown in FIG. 7). The location of a subset of tixels corresponding to a number can be substantially aligned with the location of the touch input option corresponding to that number at the display. In a specific example, generating tixels can include generating, with the secure processing system, an electrical field at a touch input option position corresponding to the number "5", where the electrical field effectuates a tactile cue of a Braille pattern for the number "5", where the number "5" can be optionally graphically displayed. Additionally or alternatively, generating tixels can be through producing localized haptic effects at the display, simulating friction at the display, and/or through any suitable means. In examples, providing tactile cues can include collecting a disabled user input can include receiving a disabled user input at a touch input option aligned with a tactile overlay (e.g., modular and attachable to the display, physically attached to the display, manipulable by a disabled user or secondary user such as a secondary user, integrated with the display, etc.) defining a tactile cue describing the touch input option providing an tactile overlay configured to overlay a region of the display.

In a fourth variation of an input option scheme, the method 200 can include collecting different types of disabled user inputs (e.g., a touch input and a mechanical input). The inputs typifying different types are preferably collected concurrently or substantially concurrently. For example, the method 200 can include receiving a touch input indicating a touch input option to be selected (e.g., a swipe gesture from a proximal tactile cue to a touch input option, where the finger is held at the touch input option), and receiving a non-touch input confirming the selection of the touch input option (e.g., a confirmatory audio input such as "yes", a mechanical input such as the clicking of a volume control button, etc.). However, receiving different types of disabled user inputs can be otherwise performed.

In a fifth variation of an input option scheme, the method 200 can include receiving a touch input at a touch input option, the touch input associated with a pressure parameter. The magnitude of the pressure parameter preferably corresponds to performing a predefined action with the POS system with respect to the touch input option. For example, the method 200 can include, in response to receiving a tap input associated with a pressure parameter below a threshold, emitting audio describing the touch input option (e.g., emitting an audio sample at the POS system speaker stating that the touch input option corresponds to the number "4"). The method 200 can include in response to the pressure parameter above the threshold, confirming selection of the touch input option (e.g., initiating the mapping of the touch input to the corresponding digital input for the POS system). However, receiving variable pressure inputs can be otherwise performed.

In a sixth variation of an input option scheme, the method 200 can include a receiving a disabled user input inputted at a disabled user device (e.g., distinct from the POS system). For example, the method 200 can include: transmitting, with the POS system, a PIN entry prompt to the disabled user device (e.g., through a Bluetooth wireless link); and receiving, at the POS system, a disabled user PIN entry input from the disabled user device. However, collecting a disabled user input from non-POS system devices can be otherwise performed.

Collecting disabled user inputs can include dynamically presenting different input option schemes. For example, the method 200 can include: prompting a disabled user to use tactile cues (e.g., positioned at the sides of the display) to guide touch inputs for PIN entry; receiving touch inputs at touch input options associated with the tactile cues (e.g., swipes beginning at a tactile cue and ending at a touch input option); in response to validating the PIN, prompting the disabled user to draw a signature (e.g., with a finger) and to confirm the signature by actuating a mechanical input (e.g., pressing a volume button, as shown in FIG. 8). However, any type of disabled user input can be collected prior to, during, and/or after a POS transaction, and/or at any suitable time. Additionally or alternatively, collecting a disabled user input can be performed in any suitable manner.

Mapping the disabled user input to a digital input S120 can function to convert one or more disabled user inputs into one or more digital inputs used in completing a POS transaction. Mapping disabled user inputs can additionally or alternatively include tailoring mapping parameters to the disabled user, and/or filtering disabled user inputs. Digital inputs can include any of: character entry (e.g., PIN number, identifiers, amount of cash to withdraw, letters, words, etc.), confirmatory entries (e.g., confirmation or denials of transaction amount, signature input, PIN input, etc.), option selections (e.g., volume options, assistance mode options, instruction options, etc.), and/or any suitable digital inputs.

Mapping the disabled user input preferably includes mapping a touch input to a digital input. For example, mapping can include mapping a multi-touch input (e.g., a first touch input of holding a finger at touch display coordinates within a character entry touch input option region, and a second touch input of tapping another finger at touch screen coordinates within a confirmatory touch input option area) to a digital input (e.g., registering the character entry in response to concurrently receiving the first and second touch inputs).

Additionally or alternatively, the method 200 can include mapping a disabled user non-touch input to one or more digital inputs. For example, the method 200 can include defining a motion gesture (e.g., a disabled user waving a hand proximal the POS system) captured at a sensor (e.g., motion sensor, camera module, light sensor, etc.) of the POS system, and mapping the motion gesture to a digital input (e.g., a confirmatory disabled user input such as for confirming a transaction amount). However, any suitable input can be mapped to any suitable digital input.

Mapping the disabled user input is preferably based on a map (e.g., stored at a secure processing system of the POS system, etc.), but can additionally or alternatively be based on any suitable data. Mapping the disabled user inputs is preferably performed in real-time as the inputs are received. Mapping is preferably performed by the secure processing system, but can additionally or alternatively be performed by any suitable component.

Mapping the disabled user inputs can optionally include tailoring mapping parameters to the disabled user, which functions to modify mapping parameters to better accommodate the disabled user in completing the POS transaction. Mapping parameters can include any of: sensitivity parameters (e.g., how strictly or loosely to define a touch input gesture in a mapping definition; pressure threshold amount for detecting a valid, mappable touch input; coordinates for a touch input option region, etc.), temporal parameters (e.g., when to perform mapping operations, length of time windows for receiving a mappable disabled user input, etc.), filtering parameters (e.g., for filtering noise from disabled user inputs), and/or any other suitable parameters. Mapping parameters are preferably tailored by a mapping model incorporating probabilistic properties, heuristic properties, deterministic properties, and/or any other suitable properties. Mapping models preferably leverage disabled user characteristic data, which can include any of: spatial ability (e.g., ability to distinguish between edge of POS screen versus the center, ability to tap in the same position, etc.), motion ability (e.g., range of motion, available hands, available fingers), input preferences (e.g., preferences for certain types of inputs, for certain touch gestures, etc.), and/or other suitable data. Disabled user characteristic data is preferably inferred from collected disabled user inputs at the POS system. For example, receiving a multi-touch input indicates that the disabled user motion ability includes multiple fingers and/or multiple hands. In another example, collecting motion sensor data describing that the disabled user picked up the POS system can indicate a preference for touch inputs and/or a high spatial ability. The method 200 can include dynamically tailoring mapping parameters (e.g., during the POS transaction) by executing one or more mapping models with disabled user characteristic data collected during the POS transaction. For example, the method 200 can include: receiving a set of disabled user inputs (e.g., multi-touch inputs at distant coordinates of the touchscreen, indicating availability of both hands of the disabled user); and dynamically selecting a subset of mappings (e.g., mappings requiring multi-touch gestures) by processing the disabled user inputs with a mapping model (e.g., a machine learning model). In another example, the method 200 can include: identifying a spatial ability (e.g., a low spatial ability inferred from a disabled user inability to tap the same coordinates twice); and initiating an input option scheme tailored to the spatial ability (e.g., an input option scheme including touch input options positioned around the perimeter of the touch screen to accommodate low spatial ability. However, tailoring mapping parameters can be otherwise performed.

Mapping the disabled user inputs can optionally include filtering disabled user inputs S125, which functions to identify valid disabled user inputs (e.g., non-noise inputs) to map. As shown in FIG. 10, disabled user inputs are preferably filtered based on one or more filtering conditions (e.g., specifying sets of touch inputs to register, sets of touch inputs to filter, etc.). Filtering conditions can include any of: touch input region (e.g., filtering touch inputs originating at regions distant a tactile cue), type of touch input (e.g., filtering swipes extending beyond a threshold distance, filtering multi-touch inputs, etc.), confirmatory conditions (e.g., filtering inputs that are received outside of a predetermined time range from a confirmatory input, etc.), temporal conditions (e.g., filtering touch inputs that extend beyond a threshold time duration without the user lifting their finger, etc.), and/or any suitable conditions. Additionally or alternatively, disabled user inputs can be filtered with a filtering model (e.g., a machine learning model, valid input thresholds such as a touch pressure threshold, etc.). For example, the method 200 can include collecting a set of disabled user inputs from a plurality of disabled users, labeling the inputs as valid or invalid, and training a filtering model with the dataset. In another example where a trained filtering model is applied, the method 200 can include collecting a series of low-pressure multi-touch inputs at the beginning of a POS transaction which can indicate that a disabled user is orienting themselves with the POS system, and the series of inputs can be filtered out with a filtering model recognizing an initial orientation pattern from the series of inputs. However, filtering the disabled user inputs can be otherwise performed. Additionally or alternatively, mapping the disabled user input can be performed in any suitable manner.

The method 200 can optionally include providing assistive feedback to the disabled user S130, which can function to guide the disabled user through a POS transaction. Providing assistive feedback can additionally or alternatively function to reduce false positive inputs, prevent merchant fraud (e.g., by providing confirmatory feedback regarding transaction information to the disabled user), and/or serve any other purpose. Assistive feedback can typify any one or more feedback types including: haptic (e.g., vibrating the POS system in response to receiving a disabled user input), audio (e.g., emitting confirmatory audio such as verifying that a 4-digit PIN has been entered), Braille (e.g., a printed Braille document), visual (e.g., for providing feedback to a secondary user), tixel (e.g., generating tixels at the display for indicating entered PIN digits (e.g., tixels representing obfuscated PIN numbers in the form of "*"), to generating tixels positioned at the location of a touch input option in response to registering a digital input corresponding to the touch input option, corresponding to a registered digital input, and/or any suitable feedback type. The feedback type is preferably general (e.g., indicating that an input has been received), but can alternatively be input-specific (e.g., indicative of the number that was entered) or otherwise mapped.

Assistive feedback can be provided at any suitable time during the POS transaction. In a first variation, the method 200 can include providing assistive feedback indicating physical positions of input options (e.g., touch input options, mechanical input options, etc.). For example, the method 200 can include emitting an audio sample (e.g., white noise) in response to touch inputs (e.g., finger placements) at coordinates corresponding to a touch input option. In another example, the method 200 can include emitting an audio sample describing a touch input option in response to finger-hold inputs at coordinates corresponding to the touch input options, and ceasing the audio sample in response to release of the finger. In another example, an assistive feedback parameter (e.g., audio volume, audio speed, haptic vibration strength, vibration frequency, etc.) can vary based on touch input locations relative a touchscreen region (e.g., haptic feedback increases in strength in response to touch inputs with coordinates closer to the center of a touch input option region). However, assistive feedback indications of input option positions can be otherwise provided.

In a second variation, the method 200 can include providing assistive feedback describing the stage of the POS transaction (e.g., descriptions of the transaction screen displayed at the POS system such as transaction amount or amount of cash to be withdrawn, descriptions of transitions to a new transaction screen, confirmations of received disabled user inputs, etc.).

In a third variation, the method 200 can include providing assistive feedback indicating the position of a POS system component (e.g., card readers, microphones, antennas such as NFC antennas), such as in response to touch inputs at touch screen coordinates proximal the POS system component (e.g., emitting audio of "Your finger is below the credit card reader"). In an example, the method 200 can include providing assistive feedback to prevent a disabled user from reaching the edges of the display (e.g., preventing the disabled user from sliding their finger off the touchscreen), such as through audio feedback (e.g., emitting a specific audio sample in response to touch inputs at coordinates proximal an edge of the touchscreen), haptic feedback, tactile cues (e.g., a raised bevel relative the touch screen, etc.). However, providing indications of positions of POS system components can be otherwise performed.

Assistive feedback can be provided at the touchscreen (e.g., haptic feedback, tactile pixels, etc.), at a speaker (e.g., for emitting audio feedback), at headphones connected to an audio port of the POS system, at the display, at a disabled user device (e.g., through transmitting transaction information from the POS system to the disabled user device to provide corresponding assistive feedback) and/or any suitable component. Providing assistive feedback is preferably performed by the main processing system (e.g., in response to receiving confirmation of inputs from the secure processing system), but can additionally or alternatively be performed by any suitable component. Assistive feedback is preferably provided directly to the disabled user, but can optionally be facilitated by a secondary user, such as by providing options to the secondary user to progress the POS transaction (e.g., prompting the secondary user at a secondary display to ask the disabled user if a PIN has been entered, and if so, prompting the secondary user to tap a confirmatory touch input option). However, providing assistive feedback can be performed in any suitable manner.

The method 200 can optionally include operating in an assistance mode S140, which can function to initiate one or more assistance modes at appropriate times for aiding a disabled user in a POS transaction. Additionally or alternatively, operating in an assistance mode can function to guide a disabled secondary user (e.g., a disabled merchant, etc.) in administering a POS transaction. A assistance mode can include one or more: input option schemes, mappings between disabled user inputs and digital inputs, mapping models, filtering models, assistive feedback provision approaches, and/or any suitable assistive features. Additionally or alternatively, controlling the POS system to operate in an assistance mode can include notifying secondary users (e.g. by transmitting text messages to secondary user devices) of the presence of a disabled user customer, communicating with non-POS system devices (e.g., smart televisions, tablets, etc.) to operate in assistive modes, and/or performing any other suitable actions.

Initiating an assistance mode is preferably based on identification of conditions indicating that a customer is a disabled user. Triggering the assistance mode can be performed at any suitable time (e.g., prior to, during, or after a POS transaction) by any suitable entity (e.g., secondary user, the POS system, the disabled user, etc.). The method 200 can optionally include controlling the POS system to cease (e.g., exit) an assistance mode (e.g., to transition into a default non-assistance mode), which can be in response to: manual triggers (e.g., a secondary user selecting an option to exit the assistance mode), automatic triggers (e.g., detecting inputs indicating that the customer is not disabled, such as a series of single-touch taps of number touch input options with gaps between each number input option, etc.), and/or any suitable trigger. However, initiating and/or exiting the assistance mode can be otherwise configured In a first variation, the method 200 can include operating the POS system n the assistance mode, where the assistance mode is the default mode. Alternatively, the POS system can be configured to only operate in the assistance mode.

In a second variation, the method 200 can include controlling the POS system to operate in an assistance mode in response to a manual triggering the assistance mode (e.g., by a secondary user such as a merchant, etc.). The manual inputs can be received during the POS transaction (e.g., in response to the secondary user recognizing that the customer is a disabled user), received prior to the POS transaction (e.g., receiving, at the POS system, a communication from a secondary user device indicating the presence of a disabled user customer), and/or at any suitable time. In an example, the method 200 can include receiving a user input from a user at the main processing system for initiation of the assistance mode; transmitting the user input from the main processing system to the secure processing system; and initiating the assistance mode at the secure processing system in response to receiving the user input from the main processing system. However, manually triggering an assistance mode can be performed in any suitable manner.

Figure 9:
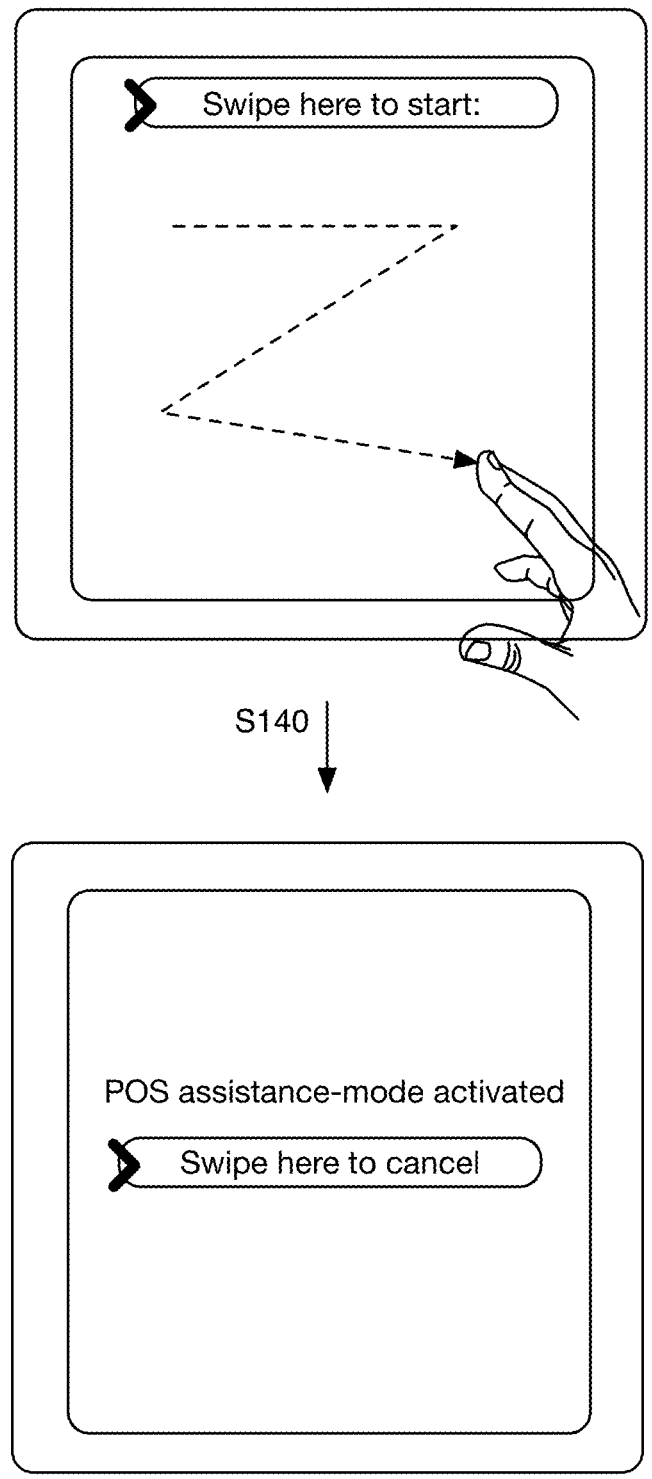
FIG. 9 is a schematic representation of a variation of initiating an assistance mode.

In a third variation, the method 200 can include automatically initiating an assistance mode at the POS system. Automatically imitating the assistance mode is preferably initiating on inputs received by the user at the display. For example, as shown in FIG. 9, identifying conditions indicative of a disabled user can include generating a touch pattern from set of touch inputs at the input, comparing the touch patterns to reference touch patterns (e.g., disabled user touch pattern, non-disabled user touch patterns), and initiating the assistance mode in response to the touch pattern substantially matching a disabled user touch pattern (e.g., a single-touch continuous gesture originating at one corner of the display, continuing boustrophedonically, and ending at another corner of the display). Additionally or alternatively, automatically initiating the assistance mode can be based on sensor data indicating a user as a disabled user. In a first example, automatically initiating an assistance mode can be based on movement data. In a specific example, the method 200 can include: tracking customer movement throughout the merchant store (e.g., by receiving movement data collected by beacons positioned around the merchant store and wirelessly connected to the POS system, by analyzing visual data captured at a camera of the POS system or a non-POS system camera, etc.), and classifying the customer as disabled or non-disabled based on the customer movement patterns. In another specific example, for customers identified as disabled, the method 200 can include tracking the disabled user location in the merchant store, and in response to the determining location coordinates proximal the POS system, initiating the assistance mode at the POS system. In a second example, automatically initiating an assistance mode can be based on audio data. For example, the method 200 can include recording customer statements at a microphone of the POS system, analyzing the recorded data, and initiating the assistance mode in response to the analysis indicating a disabled user (e.g., a disabled user telling a secondary user that they're visually impaired). In a third example, automatically initiating the assistance mode can be based on optical data (e.g., captured a POS system camera, captured at a security camera in the merchant store and transmitted to the POS system, etc.). In a specific example, optical data sampled at an ambient light sensor of the display can be used to select between the assistance mode and the non-assistance mode (e.g., selecting the assistance mode in response to the optical data indicating that tactile cues have been coupled to the display, such as where a coupling component blocks the ambient light sensor, etc.). In another specific example, computer vision techniques can be applied to the visual data for performing object identification on any of: mobility-assistance devices (e.g., cane, walker, crutch, motorized scooter, wheelchairs, rollators, ramps, etc.), guide animals, Braille products (e.g., Braille watch, Braille paper, Braille notetaker, etc.), low vision products (e.g., magnifiers, sunglasses, reading aids, etc.), alerting indicators (e.g., vibrational alerters, audio alerters, etc.), and/or any suitable assistive tools. In a specific example, the method 200 can include capturing an image of the customer with a POS system camera, identifying a white cane in the mage, classifying the customer as a disabled user based on the identified white cane, and initiating the assistance mode in response to classifying the customer. However, automatically initiating an assistance mode can be otherwise performed.

In a fourth variation, the method 200 can include dynamically initiating an assistance mode (e.g., at any point during a POS transaction). For example, the method 200 can include graphically displaying touch input options (e.g., alphanumeric character graphics, an input option scheme inappropriate for the visually impaired, etc.) at the display, initiating an assistance mode (e.g., in response to detecting conditions indicative of a disabled user, in response to manual triggers), and selecting an assistance map for mapping inputs received in the assistance mode. The method 200 can include transforming the touch input options to be visually indiscernible (e.g., invisible, obscured, etc.) in the assistance mode, such as by transmitting an instruction from the secure processing system to the main processing system to restrict graphical displays of touch input options. In another example, the method 200 can include graphically displaying touch input options, initiating an assistance mode, and selecting an assistance map for mapping the disabled user inputs. In another example, the method 200 can include graphically displaying touch input options at positions separated from edges of the display by a gap element (e.g., a virtual bezel, tactile cues, etc.), receiving inputs (e.g., touch inputs) at the gap element, where inputs originating at the gap element are mapped by an assistance map, and inputs originating at non-gap elements (e.g., a center region of the display) are mapped by a non-assistance map.

In a fifth variation, the method 200 can include receiving a request from the disabled user to initiate an assistance mode. The disabled user request can be received at the POS system during the POS transaction (e.g., in response to emitting audio at the POS system, asking whether the customer would like to complete the transaction in an assistance mode), prior to the POS transaction (e.g., establishing a wireless connection with a disabled user device such as while the disabled user is shopping, and receiving a request for an assistance mode from the disabled user device), and/or at any suitable time. In an example, the method 200 can include prompting the customer at the display to enter an input indicative of a disability (e.g., displaying "Can you see this?" with "Yes" and "No" touch input options, visually prompting a user to trace a touch input option path), where inputs and/or lack of inputs received in response to the prompting can be used in determining whether to initiate an assistance mode. In another example, receiving a request can include receiving a disability identifier (e.g., an electric ADA identification), such as through any of: NFC transmission (e.g., received at an NFC reader of the POS system), RFID and/or beacon transmission, transmission from a mobile device of the disabled user (e.g., through Bluetooth, WiFi, etc.), physical transmission (e.g., sliding an ADA identification card at a card reader of the POS system), and/or through any suitable means. However, receiving the disabled user request can be otherwise performed. Additionally or alternatively, controlling the POS system to operate in an assistance mode can be performed in any suitable manner.

Alternatively, the POS system can be operable in a single mode. The system can use the same map, where one or more different inputs map to the same input value. In a first example, both a tap on the region overlaying a displayed number and a swipe through the region overlaying a displayed number map to the displayed number. In a second example, both a tap on the region overlaying the displayed number and a tracing of a number map to the number. In a third example, both a tap on a first region overlaying a displayed number (e.g., number displayed on a conventional numpad) and a swipe through a second region associated with a tactile cue representing the number (e.g., on the bezel) can be interpreted as the same number. The first and second regions can be different (e.g., separate regions). The second region can overlay a portion of the display that has no visible indication of the number, or overlay an icon of the number. However, the POS system can be otherwise operable in a single mode.

As shown in FIG. 3, the method 200 can optionally include instructing the disabled user on how to use the POS system S150, which can function to educate the disabled user about the assistive functionality of the POS system. Instructing the disabled user can optionally include administering a calibration session.

Instructing the disabled user is preferably performed at the POS system, but can additionally or alternatively be performed at any suitable component. For example, instructing the disabled user can include providing an instructions option (e.g., a touch input option, a mechanical input option) configured to initiate provision of instructions (e.g., audio emission of instructions) when selected. The instructions option preferably corresponds to a tactile cue (e.g., a Braille printing along the edge of the display indicating the position of a proximal instructions touch input option). In another example, graphical instructions can be displayed to a secondary user (e.g., a secondary user at a secondary display), prompting the secondary user to guide the disabled user through the transaction (e.g., prompting the secondary user to ask for a disabled user's credit card and to insert it into the card reader).

Instructing the disabled user is preferably performed during the POS transaction, but can additionally or alternatively be performed prior to the POS transaction, and/or at any suitable time. For example, the method 200 can include collecting disabled user location data, and communicating instructions to a disabled user device in response to the location data indicating that the disabled user is waiting in line to checkout. In another example, the POS system can communicate with non-POS system devices interfacing with the disabled user to provide instructions on how to use the assistive features of the POS system. In another example, the POS system can prompt remote secondary users (e.g., at secondary user devices connected to the POS system) to instruct the disabled user (e.g., while the disabled user is shopping) on how to use the POS system.

Instructing the disabled user can additionally or alternatively include initiating a calibration session at the POS system, which functions to collect disabled user inputs to be used in selecting assistive features (e.g., input option schemes, mapping parameters, assistive feedback approaches, etc.) for the POS transaction. For example, administering the calibration session can include prompting the disabled user to orient themselves with the POS system by providing touch inputs at the touch screen, analyzing the touch inputs, and tailoring the assistance mode to the disabled user based on the touch inputs. In a specific example, calibrating the assistance mode can include prompting the disabled user to perform a series of single-touch taps; determining pressure parameters corresponding to the single-touch taps, and adjusting a pressure sensitivity parameter (e.g., for a filtering model, for a mapping model, etc.) based on the pressure parameters. In another specific example, administering the calibration session can include prompting a disabled user to swipe their finger from a tactile cue to the touch screen along an axis, analyzing the alignment of the touch input with the axis, and adjusting a sensitivity parameter for swipe gestures based on the alignment. However, instructing the disabled user can be performed in any suitable manner.

The method 200 can optionally include hindering disabled user information theft, which functions to prevent individuals (e.g., other customers, secondary users, hackers, etc.) from stealing the disabled user's private information (e.g., through another customer's visual observation of PIN entry inputs by the disabled user). In a first variation, hindering disabled user information theft can include providing a view barrier (e.g., physical barrier) obstructing viewing of the display from other individuals (e.g., attaching a hood that covers the screen, tinted screen, limiting viable viewing angles). For example, the view barrier can include a hood surrounding (e.g., arcuately surrounding) the set of tactile cues, where a height of the hood is elevated above a surface of the set of tactile cues (and/or a surface of the touch display, etc.), but the view barrier can be situated at any suitable positions relative touch displays and/or tactile cues in order to hinder disabled user information theft. In another example, the physical barrier can act as a reference point for directing a disabled user to a tactile cue (e.g., a starting tactile cue that provides instructions on how to navigate the assistance mode). Additionally or alternatively, the physical barrier can be a tactile cue associated with an input option, can be an input option (e.g., the physical barrier including a mechanical input electrically connected to the secure processing system), and/or be otherwise configured. In another example, a polarized filter can be applied to the display in the assistance mode. In another variation, hindering the information theft can include modifying an input option scheme. For example, input options can be made visually invisible while retaining functionality. In another example, the display can display no items (e.g., a black screen). In another example, hindering information theft can include selecting (e.g., randomly, according to a predetermined selection pattern, etc.) an input option scheme from a set of different input option schemes. In another variation, hindering information theft can include prompting the disabled user to perform a security action (e.g., prompting the disabled user to hold the POS system close to the body to obstruct view; prompting the disabled user to use headphones with the POS system to receive audio feedback; prompting the disabled user to perform divertive touch gestures such as in-between entering PIN numbers, etc.). In another variation, hindering information theft can include prompting the secondary user to perform a security action (e.g., prompting the secondary user to use their hands to cover the POS system from other customers. However, hindering disabled user information theft can be otherwise performed.

The method 200 can optionally include updating POS system data S160, which can function to leverage data collected during a POS transaction to tailor assistive features for future transactions. POS system data can include any of: assistive features (e.g., input option schemes, maps, models, assistive feedback approaches, etc.), profiles (e.g., customer profiles, disabled user profiles, secondary user profiles, etc.), and/or any suitable data. In a variation, updating POS system data can include generating and/or updating a customer profile (e.g., manually by a secondary user, automatically by the POS system such as in response to automatically identifying conditions appropriate for initiating an assistance mode, etc.) to indicate disabled user status, preferred assistive features, and/or other suitable information. Customer profile information can be used to trigger an assistance mode, (e.g., for subsequent POS transactions with the disabled user), to administer a personalized assistance mode, and/or for any suitable purpose.

Updating POS system data is preferably performed with a remote computing system (e.g., that generates the update; that transmits the update to the POS system; etc.). For example, updating POS system data can include transmitting an updated assistance map (e.g., including updated mappings between touch input locations and digital inputs, such as where a touch input at a same touch display region will map to a different digital input compared to when using the original mapping; etc.) from a remote computing system to the secure processing system of a POS system.

Additionally or alternatively, updating POS system data can be performed with any suitable components (e.g., secondary user devices, user devices, secondary POS systems, etc.), but updating POS system data can be otherwise performed. However, the method 200 can be configured in any suitable manner.

Although omitted for conciseness, the embodiments include every combination and permutation of the various system components and the various method processes, including any variations, examples, and specific examples, where the method processes can be performed in any suitable order, sequentially or concurrently using any suitable system components.

The system and method and embodiments thereof can be embodied and/or implemented at least in part as a machine configured to receive a computer-readable medium storing computer-readable instructions. The instructions are preferably executed by computer-executable components preferably integrated with the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the embodiments without departing from the scope defined in the following claims.

We claim:

1. A system for assisting a disabled user, comprising:
a touch screen;
a set of tactile cues arranged proximal the touch screen, wherein each tactile cue of the set is associated with a different input value;
an assistance map, the assistance map associating each of a first set of touch coordinate regions of the touch screen with a different input value, wherein each touch coordinate region is arranged proximal the corresponding tactile cue associated with the respective input value;
a non-assistance map, the non-assistance map associating a second set of touch coordinate regions of the touch screen with the input values; and
a processing system connected to the touch screen, the processing system operable between:
an assistance mode, wherein the processing system is configured to map touch inputs, received at the touch screen, to input values based on the assistance map; and
a non-assistance mode, wherein the processing system is configured to map touch inputs, received at the touch screen, to input values based on the non-assistance map.

2. The system of claim 1, further comprising:
a main processing system connected to the processing system, wherein the processing system is configured to execute a first operating system, and wherein the main processing system is configured to execute a second operating system different from the first operating system; and
a housing enclosing the processing system and the main processing system.

3. The system of claim 2, wherein the processing system is further configured to toggle the processing system between the assistance mode and the non-assistance mode based on receipt of a user input.

4. The system of claim 1, further comprising a bezel surrounding the touch screen, wherein the bezel comprises the tactile cues.

5. A system for assisting a disabled user, comprising:
a touch screen;
a set of tactile cues arranged proximal the touch screen, wherein the tactile cues are associated with an input value set;
an assistance map, the assistance map mapping distinct touch coordinate regions of the touch screen to different input values of the input value set, wherein each tactile cue is arranged proximal the touch coordinate region associated with the same input value;
a secure processing system connected to the touch screen, the secure processing system configured to map touch inputs, received at the touch screen, to input values of the input value set based on the assistance map;
a main processing system, separate and distinct from the secure processing system, that is connected to the secure processing system; and
a housing enclosing the secure processing system and the main processing system.

6. The system of claim 5, further comprising a non-assistance map, wherein the processing system is configured to operate between:
an assistance mode, wherein the processing system maps the touch inputs to the input values based on the assistance map; and
a non-assistance mode, wherein the processing system maps the touch inputs to the input values based on the non-assistance map.

7. The system of claim 5, further comprising a set of touch patterns associated with valid data inputs, wherein the set of touch patterns comprise radially inward touch vectors, wherein the processing system maps the touch inputs to input values when the touch inputs are determined to be valid data inputs based on the set of touch patterns.

8. The system of claim 5, wherein the touch cues are arranged along a perimeter of the touch screen.

9. The system of claim 5, further comprising a payment card reader connected to the processing system.

10. A system for assisting a disabled user, comprising:
a touch screen;
a payment card reader;
a set of tactile cues arranged proximal the touch screen, wherein each tactile cue in the set is different from other tactile cues in the set, wherein each tactile cue is associated with a different input value of an input value set;
an assistance map, the assistance map mapping distinct touch coordinate regions of the touch screen to different input values of the input value set, wherein each tactile cue is arranged proximal the touch coordinate region associated with the same input value;
a processing system connected to the touch screen and to the payment card reader;
a main processing system communicably connected to and physically distinct from the processing system; and
a wireless communication system communicably connected to the main processing system;
wherein the processing system is configured to:
 map touch inputs, received at the touch screen, to input values of the input value set based on the assistance map;
 receive payment information from the payment card reader;
 generate an encrypted packet based on the payment information; and
 send the encrypted packet to the main processing system; and
wherein the main processing system is configured to send the encrypted packet to a remote endpoint via the wireless communication system.

11. The system of claim 10, further comprising a non-assistance map, wherein the processing system is configured to operate between:
 an assistance mode, wherein the processing system maps the touch inputs to the input values based on the assistance map; and
 a non-assistance mode, wherein the processing system maps the touch inputs to the input values based on the non-assistance map.

12. The system of claim 11, wherein the non-assistance map maps a second set of distinct touch coordinate regions of the touch screen to the input value set; wherein the distinct touch coordinate regions of the assistance map are different from, and collectively overlap with, the touch coordinate regions of the second set of distinct touch coordinate regions.

13. The system of claim 10, further comprising a set of touch patterns associated with valid data inputs, wherein the processing system maps the touch inputs to input values when the touch inputs are determined to be valid data inputs, based on the set of touch patterns.

14. The system of claim 13, wherein the set of touch patterns comprise radially inward touch vectors.

15. The system of claim 10, wherein the tactile cues are mounted along a perimeter of the touch screen.

16. The system of claim 15, wherein the set of tactile cues comprise embossed numbers.

17. The system of claim 15, wherein the set of tactile cues are removably mounted along the perimeter of the touch screen.

18. The system of claim 10, wherein the processing system is configured to execute a first operating system, and wherein the main processing system is configured to execute a second operating system different from the first operating system.

* * * * *